United States Patent
Sekiguchi et al.

(10) Patent No.: US 7,532,762 B2
(45) Date of Patent: May 12, 2009

(54) IMAGE CODING/DECODING METHOD, IMAGE CODING APPARATUS AND IMAGE DECODING APPARATUS FOR OBTAINING DECODED IMAGES HAVING SMALL DISTORTION IN DCT BASED STANDARD CODING/DECODING

(75) Inventors: Shunichi Sekiguchi, Yamato (JP); Minoru Etoh, Yokohama (JP)

(73) Assignee: NTT DoComo, Inc., Tokyo (JP)

( * ) Notice: Subject to any disclaimer, the term of this patent is extended or adjusted under 35 U.S.C. 154(b) by 297 days.

(21) Appl. No.: 10/003,113

(22) Filed: Dec. 6, 2001

(65) Prior Publication Data

US 2002/0102029 A1    Aug. 1, 2002

(30) Foreign Application Priority Data

Dec. 7, 2000 (JP) ............... 2000-373462
Mar. 14, 2001 (JP) ............... 2001-072904

(51) Int. Cl.
*G06K 9/36* (2006.01)
*G06K 9/46* (2006.01)
*G06K 9/48* (2006.01)
*G06F 7/00* (2006.01)
*G06F 15/00* (2006.01)

(52) U.S. Cl. .............. 382/233; 382/199; 382/243; 708/203

(58) Field of Classification Search ............. 382/166, 382/190, 199, 232, 233, 243, 254, 263, 275, 382/264, 266; 348/384.1; 358/426.01; 375/240; 708/203
See application file for complete search history.

(56) References Cited

U.S. PATENT DOCUMENTS

| | | | | |
|---|---|---|---|---|
| 4,162,482 A | * | 7/1979 | Su | 382/202 |
| 5,133,020 A | * | 7/1992 | Giger et al. | 382/128 |
| 5,426,673 A | * | 6/1995 | Mitra et al. | 375/241 |
| 5,432,870 A | | 7/1995 | Schwartz | |
| 5,453,844 A | * | 9/1995 | George et al. | 382/264 |
| 5,495,538 A | * | 2/1996 | Fan | 382/233 |
| 5,533,149 A | * | 7/1996 | Kaplan et al. | 382/260 |
| RE35,414 E | * | 12/1996 | Murakami et al. | 348/420.1 |
| 5,612,744 A | * | 3/1997 | Lee et al. | 348/416.1 |

(Continued)

FOREIGN PATENT DOCUMENTS

JP    08-126003    5/1996

OTHER PUBLICATIONS

Tetsuo Shimono, et al., "Transform Image Coding with Edge Compensation", Electronics & Communications in Japan, Part I—Communications, vol. 74, No. 10., Oct. 1, 1991, XP000303553, pp. 49-56.

*Primary Examiner*—Yubin Hung
(74) *Attorney, Agent, or Firm*—Oblon, Spivak, McClelland, Maier & Neustadt, P.C.

(57) ABSTRACT

An image coding method is provided, in which the method includes the steps of: extracting edge information which represents an edge part of an original image; obtaining density information of an edge smoothed image from the original image by smoothing the edge part; obtaining coded edge information by coding the edge information according to a first coding algorithm; obtaining coded density information by coding the density information of the edge smoothed image according to a second coding algorithm; and sending the coded edge information and the coded density information as coded information to an image decoding apparatus.

24 Claims, 16 Drawing Sheets

U.S. PATENT DOCUMENTS

| | | | |
|---|---|---|---|
| 5,703,965 A * | 12/1997 | Fu et al. | 382/232 |
| 5,791,271 A * | 8/1998 | Futamura | 112/102.5 |
| 5,862,264 A * | 1/1999 | Ishikawa et al. | 382/249 |
| 5,984,366 A * | 11/1999 | Priddy | 283/72 |
| 6,229,578 B1 * | 5/2001 | Acharya et al. | 348/607 |
| 6,330,371 B1 * | 12/2001 | Chen et al. | 382/260 |
| 6,363,526 B1 * | 3/2002 | Vlahos et al. | 725/37 |
| 6,621,909 B1 * | 9/2003 | Webb et al. | 381/342 |
| 6,788,824 B1 * | 9/2004 | Prestia | 382/263 |

\* cited by examiner

FIG. 4

| 4 | 3 | 2 | 1 |   | 1 | 2 |
|---|---|---|---|---|---|---|
| 3 | 2 | 1 |   |   | 1 | 2 |
| 3 | 2 | 1 |   | 1 | 2 | 3 |
| 3 | 2 | 1 |   | 1 | 2 | 3 |
| 3 | 2 | 1 |   | 1 | 2 | 3 |
| 3 | 2 | 1 |   | 1 | 2 | 3 |
| 2 | 1 |   |   | 1 | 2 | 3 |

FIG. 7

| 0 | 1 | 0 |
|---|---|---|
| 1 | 4 | 1 |
| 0 | 1 | 0 |

/8

FIG. 8A $$E = \begin{bmatrix} 8 & 0 & 0 & 0 & 0 & 0 & 0 & 0 & 0 \\ 0 & 8 & 0 & 0 & 0 & 0 & 0 & 0 & 0 \\ 0 & 0 & 8 & 0 & 0 & 0 & 0 & 0 & 0 \\ 0 & 0 & 0 & 8 & 0 & 0 & 0 & 0 & 0 \\ 0 & 1 & 0 & 1 & 4 & 1 & 0 & 1 & 0 \\ 0 & 0 & 0 & 0 & 0 & 8 & 0 & 0 & 0 \\ 0 & 0 & 0 & 0 & 0 & 0 & 8 & 0 & 0 \\ 0 & 0 & 0 & 0 & 0 & 0 & 0 & 8 & 0 \\ 0 & 0 & 0 & 0 & 0 & 0 & 0 & 0 & 8 \end{bmatrix} / 8$$

FIG. 8B $$P = \begin{bmatrix} 8 & 0 & 0 & 0 & 0 & 0 & 0 & 0 & 0 \\ 0 & 8 & 0 & 0 & 0 & 0 & 0 & 0 & 0 \\ 0 & 0 & 8 & 0 & 0 & 0 & 0 & 0 & 0 \\ 0 & 0 & 0 & 8 & 0 & 0 & 0 & 0 & 0 \\ 0 & 0 & 0 & 0 & 8 & 0 & 0 & 0 & 0 \\ 0 & 0 & 0 & 0 & 0 & 8 & 0 & 0 & 0 \\ 0 & 0 & 0 & 0 & 0 & 0 & 8 & 0 & 0 \\ 0 & 0 & 0 & 0 & 0 & 0 & 0 & 8 & 0 \\ 0 & 0 & 0 & 0 & 0 & 0 & 0 & 0 & 8 \end{bmatrix} / 8$$

FIG. 8C $$O = \begin{bmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 8 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix} / 16$$

FIG. 9

$$E^{-1} = \begin{pmatrix} 8 & 0 & 0 & 0 & 0 & 0 & 0 & 0 & 0 \\ 0 & 8 & 0 & 0 & 0 & 0 & 0 & 0 & 0 \\ 0 & 0 & 8 & 0 & 0 & 0 & 0 & 0 & 0 \\ 0 & 0 & 0 & 8 & 0 & 0 & 0 & 0 & 0 \\ 0 & 1 & 0 & 1 & 4 & 1 & 0 & 1 & 0 \\ 0 & 0 & 0 & 0 & 0 & 8 & 0 & 0 & 0 \\ 0 & 0 & 0 & 0 & 0 & 0 & 8 & 0 & 0 \\ 0 & 0 & 0 & 0 & 0 & 0 & 0 & 8 & 0 \\ 0 & 0 & 0 & 0 & 0 & 0 & 0 & 0 & 8 \end{pmatrix} / 8$$

EDGE POSITION

FIG. 11

| | | |
|---|---|---|
| 0 | 1 | 0 |
| 1 | 4 | 1 |
| 0 | 1 | 0 |

| $p_1$ $(x_1)$ | $p_2$ $(x_2)$ | $p_3$ $(x_3)$ |
|---|---|---|
| $p_4$ $(x_4)$ | $p$ $(x)$ | $p_5$ $(x_5)$ |
| $p_6$ $(x_6)$ | $p_7$ $(x_7)$ | $p_8$ $(x_8)$ |

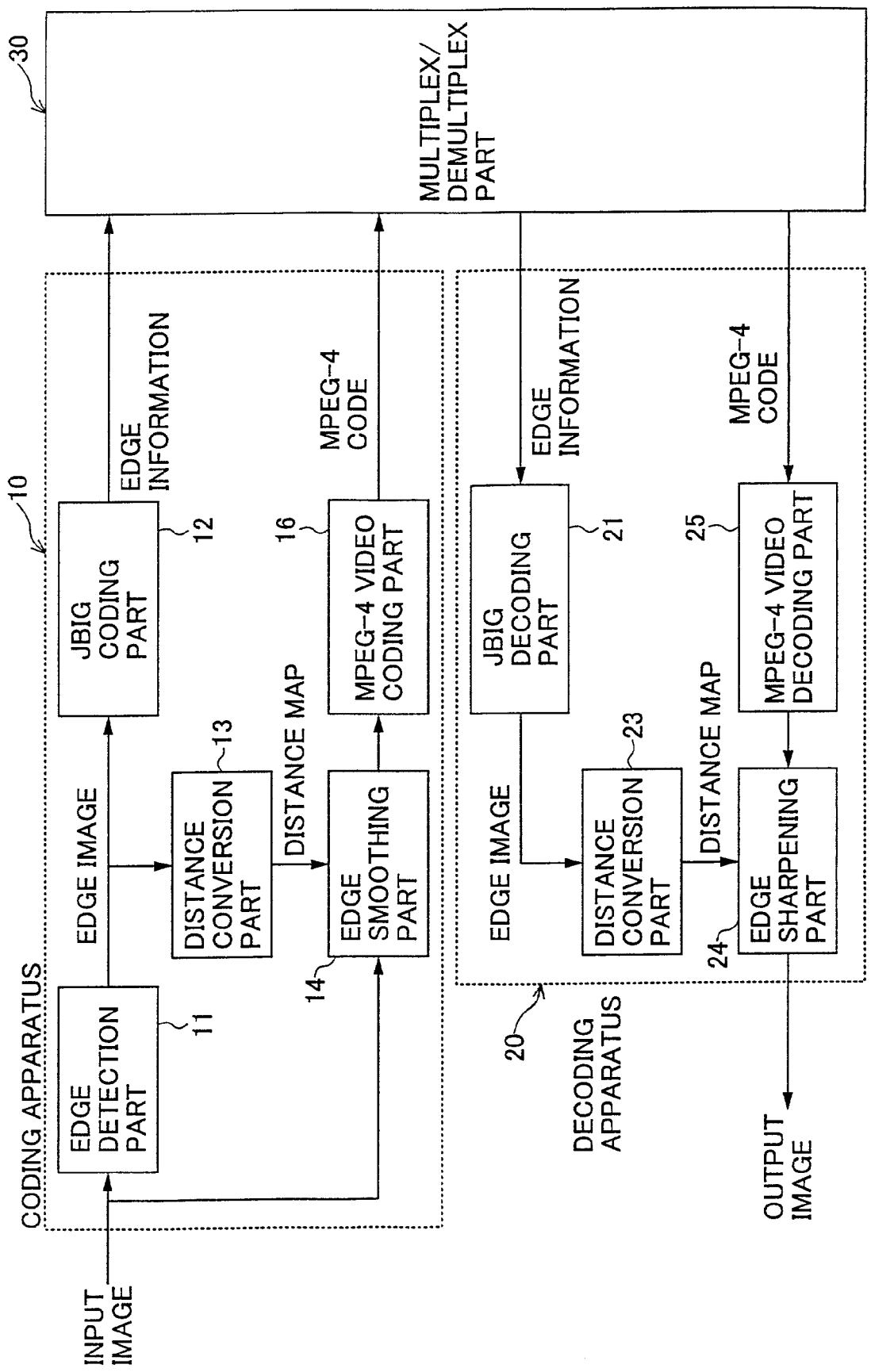

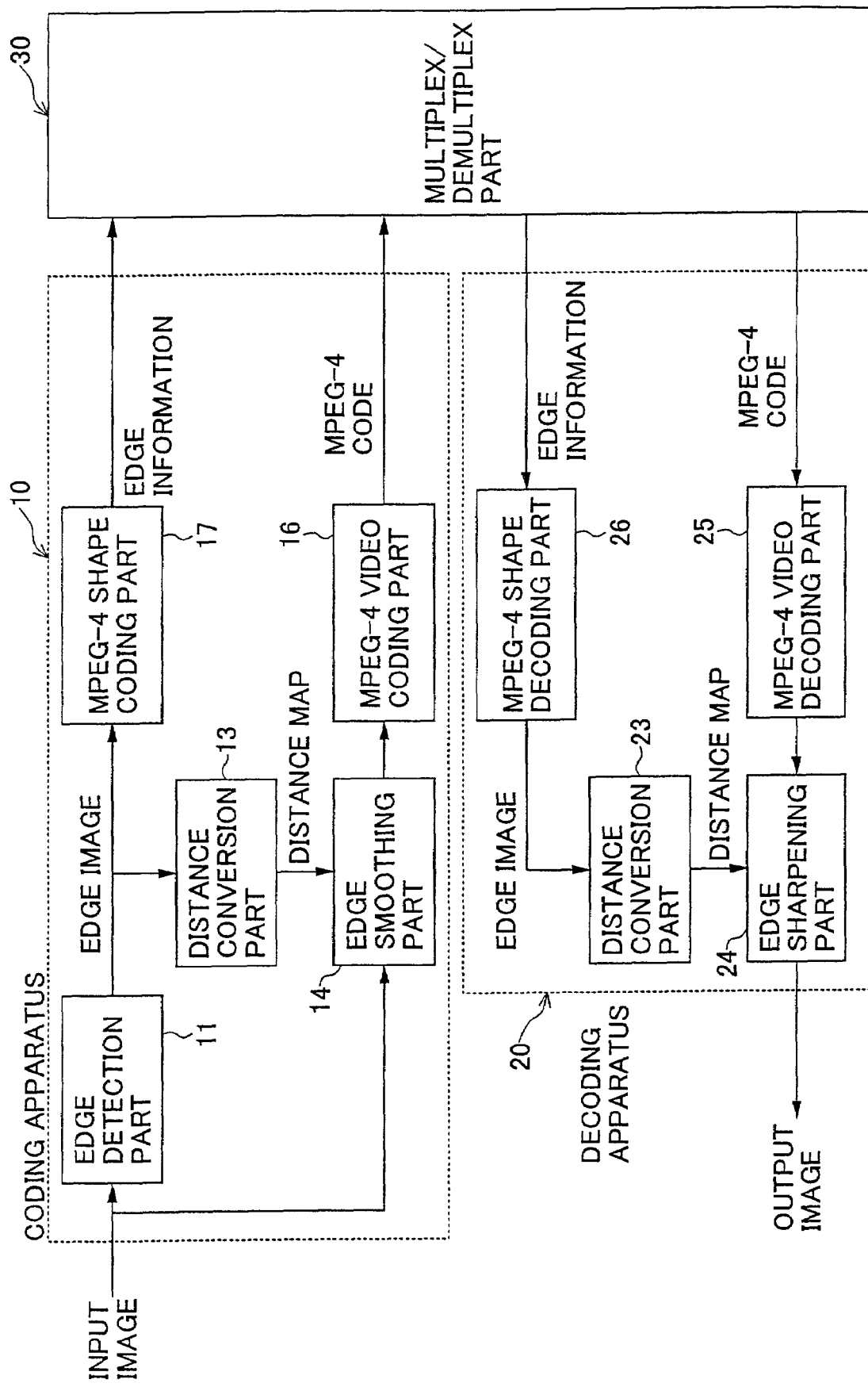

IMAGE CODING/DECODING METHOD, IMAGE CODING APPARATUS AND IMAGE DECODING APPARATUS FOR OBTAINING DECODED IMAGES HAVING SMALL DISTORTION IN DCT BASED STANDARD CODING/DECODING

BACKGROUND OF THE INVENTION

1. Field of the Invention

The present invention relates to an image coding/decoding method used for coding original images such as a moving image and a still image, and decoding coded images. More particularly, the present invention relates to an image coding/decoding method which can decrease noise for decoding coded images while applying a standardized algorithm such as MPEG-1/2/4 and the like.

In addition, the present invention relates to an image coding apparatus and an image decoding apparatus which perform coding and decoding of images according to the image coding/decoding method.

2. Description of the Related Art

Conventionally, in standard image/moving image coding methods such as JPEG and MPEG series, discrete cosine transform (DCT) has been used for various reasons. Especially, these coding methods has been adopted from the viewpoint of adaptability to image properties.

Normally, when representing an image in the spatial frequency region, there is a property that power concentrates on a low frequency region. The DCT is a method in which a block formed by 8×8 pixels in an image signal (density information) space is orthogonally transformed so that the block is broken down to a combination of predetermined base sets and coefficients of constituent base are obtained. The characteristic of DCT is that degree of bias of coefficients, that is, degree of bias of frequency components can be increased. Especially, compression efficiency can be increased by performing adaptive bit distribution since the degree of concentration is higher in the low frequency region and the low frequency region is visually important.

On the other hand, when coding an image at a very low bit rate, quantization becomes rough so that reproducibility of coefficients becomes worse. Thus, a problem occurs in that the base which is important for representing image signal can not be reconstructed. In addition, DCT performs processing on the region closed in the 8×8 pixel blocks, distortion of coding tends to appear remarkably on boundaries of the block. Due to this tendency, block distortion occurs so that components which are not visually included in the signal appears on the image. Thus, it is detected as noise which is very conspicuous. Especially, in waveform parts where luminance (density) changes abruptly such as in step edges, many bases become necessary for reproducing the image faithfully. However, code assignment for coefficients corresponding to high frequency component is thought to be less important than code assignment for coefficients corresponding to low frequency component in consideration of visual weight. Thus, high frequency coefficients important for reproducing the edge are lost. Due to such processing, conspicuous noise which is intrinsic to DCT appears in the edge part so that image degradation occurs.

In the light of the above-mentioned problem, an image coding apparatus has been proposed in which DCT and differential pulse-code modulation (DPCM) are switched adaptively according to image patterns (for example, Japanese laid-open patent application No.5-276506). This conventional image coding apparatus avoids the signal representation problem of DCT by using DPCM for processing the edge part instead of using DCT.

However, according to the conventional image coding apparatus, the standard coding method using the existing DCT as-is can not be applied. Therefore, some kind of applicable coding method other than the standard coding method is necessary. However, since there are many products which comply with the standard coding method using DCT, it is important to be able to perform coding and decoding of an image by using the standard coding method.

SUMMARY OF THE INVENTION

A first object of the present invention is to provide an image coding/decoding method in which an decoded image having small distortion can be obtained even when the standard coding/decoding method using DCT is applied.

A second object of the present invention is to provide an image coding apparatus and an image decoding apparatus which perform coding and decoding of an image according to the image coding/decoding method.

The above object is achieved by an image coding/decoding method in which an image coding apparatus sends coded information which is obtained by coding an original image to an image decoding apparatus and the image decoding apparatus decodes the coded information to obtain a reproduced image, the image coding apparatus performing the steps of:

extracting edge information which represents an edge part of the original image;

obtaining density information of an edge smoothed image from the original image by smoothing the edge part;

obtaining coded edge information by coding the edge information according to a first coding algorithm;

obtaining coded density information by coding the density information of the edge smoothed image according to a second coding algorithm;

sending the coded edge information and the coded density information as the coded information to the image decoding apparatus; and the image decoding apparatus performing the steps of:

obtaining the edge information by decoding the coded edge information according to a first decoding algorithm corresponding to the first coding algorithm;

obtaining the density information of the edge smoothed image by decoding the coded density information according to a second decoding algorithm corresponding to the second coding algorithm;

obtaining the reproduced image from the density information of the edge smoothed image by sharpening the edge part of the edge smoothed image by using the edge information.

According to the image coding/decoding method, the image coding apparatus extracts the edge part of the original image and obtains the edge smoothed image by smoothing the edge part of the original image. Then, the image coding apparatus sends coded information of the original image to the image decoding apparatus in which the coded information includes coded edge information which is obtained from edge information representing the edge part according to a first coding algorithm and coded density information which is obtained from density information of the edge smoothed image according to a second coding algorithm.

The image decoding apparatus sharpens the edge part of the edge smoothed image obtained from the coded density information according to a second decoding algorithm by using the edge information obtained from the coded edge information according to a first decoding algorithm. Then, a reproduced image is obtained from the edge smoothed image by sharpening the edge part.

Since the edge part is smoothed in the edge smoothed image, relatively high spatial frequency components decreases. Thus, even when the standard coding method using DCT is used as the second coding algorithm, information which is lost by coding decreases.

The first coding algorithm used for coding the edge information and the second coding algorithm used for coding density information of the edge smoothed image may be or not may be the same.

The edge information may be any information as long as the position (pixel) of the edge part can be identified.

The density information is information which represents state of image density such as density or luminance (or brightness) and the form of the density information is not limited to a specific form.

From the viewpoint of being able to perform the smoothing process of the edge part of the original image relatively easily, the image coding apparatus may smooth the edge part by performing, while scanning the original image pixel by pixel, the steps of:

performing first matrix operation by using a first block density information vector and a smoothing matrix, wherein the first block density information vector is obtained by arranging density information of each pixel included in a first block, the first block includes a pixel in the edge part or in a near region of the edge part and includes pixels in a surrounding region around the pixel, and order of the first block density information vector corresponds to the number of pixels in the first block, and wherein the smoothing matrix includes coefficients used for edge smoothing which operate on density information of each pixel in the first block;

obtaining smoothed density information of each pixel by overlaying density information of each pixel in the first block obtained by performing the first matrix operation on each pixel while scanning the original image pixel by pixel.

According to the image coding/decoding method, the density information of the edge smoothed image can be obtained by matrix operation using the smoothing matrix (which is a square matrix) and the block density information vector.

From the viewpoint of being able to sharpen the edge part of the edge smoothed image easily, the image decoding apparatus may sharpen the edge part of the edge smoothed image by performing, while scanning the edge smoothed image pixel by pixel, the steps of:

performing second matrix operation by using a second block density information vector and a sharpening matrix which is an inverse matrix of the smoothing matrix, wherein the second block density information vector is obtained by arranging density information of each pixel included in a second block, the second block includes a pixel in the edge part or in a near region of the edge part and pixels in the surrounding region, and order of the second block density information vector corresponds to the number of pixels in the second block; and obtaining sharpened density information of each pixel by overlaying density information of each pixel in the second block obtained by performing the second matrix operation on each pixel while scanning the edge smoothed image pixel by pixel.

According to the image coding/decoding method, the density information of each pixel which is sharpened can be obtained by matrix operation using the block density information and the sharpening matrix which is an inverse matrix of the smoothing matrix.

From the viewpoint of being able to obtain more accurate reproduced image in sharpening process, the image coding apparatus may smooth the edge part by performing the steps of:

obtaining density information x' of a pixel of the edge part of the edge smoothed image according to a first equation x'=(1−λ)x+λC, wherein λ is a positive constant, x is density information of the pixel of the original image, and C is surrounding density information representing density state of a surrounding region of the pixel.

The surrounding density information C is determined on the basis of density information of surrounding pixels of the pixel. The surrounding density information C is not limited to specific information as long as it represents state of density around the pixel. For example, a mean value of density information of surrounding pixels, total added value, added value of weighted density information or the mean value of the added value of weighted density information or the like can be used as C. λ in the above equation depends on how to determine the surrounding density information C.

From the viewpoint of reproducing image from the smoothed image smoothed by x'=(1−λ)x+λC, the image decoding apparatus may sharpen the edge part of the edge smoothed image by using a predetermined equation according to a steepest-descent method, the predetermined equation being defined on the basis of the relationship between the density information x' and sharpened density information formulated by the first equation.

The predetermined equation may be $$e(X) = \left(X + \frac{1}{1-\lambda}(\lambda C(n) - x')\right)^2$$

in which C(n) is the surrounding density information for a pixel having density information x' and n is a repetition count number, and a value of X which minimizes e(X) is obtained by the steepest-descent method and the value of X becomes density information of a pixel after sharpened.

From the viewpoint of providing a concrete method of the steepest-descent method, in a process according to the steepest-descent method, X is obtained as a convergence value of a recurrence formula $$X(n+1) = X(n) - G * \frac{\partial e}{\partial X},$$

wherein G is a constant.

The second object can be achieved by an image coding apparatus including:

an edge extracting part for extracting edge information which represents an edge part of an original image;

an edge smoothing part for obtaining density information of an edge smoothed image from the original image by smoothing the edge part;

a first coding part for obtaining coded edge information by coding the edge information according to a first coding algorithm;

a second coding part for obtaining coded density information by coding the density information of the edge smoothed image according to a second coding algorithm;

wherein the coded edge information and the coded density information are coded information of the original image.

Accordingly, decoding of the original image becomes possible by using the coded edge information and the coded density information obtained as the coded information.

When decoding only coded density information, the edge smoothed image is reproduced.

From the viewpoint of providing a concrete method for obtaining the edge smoothed image, the edge smoothing part may include a density information correction part for correcting density information of each pixel such that variation of density levels represented by density information of pixels which are arranged across the edge part in a near region of the edge part of the original image is lowered.

Since the variation of density levels represented by the density information of pixels arranged across the edge part in the near region of the edge part of the original image becomes small, abrupt change of the density levels can be eliminated so that the edge part is smoothed.

From the viewpoint of providing a further concrete method for obtaining the edge smoothed image, the density information correction part may includes:

a mean value calculation part for calculating a mean value of the density levels in a predetermined region; and a density level judgement part for judging whether the density level of a pixel is higher or lower than the mean value for each pixel in the near region;

wherein density information is corrected for a pixel in which the density level is higher than the mean value such that the density level is lowered, and density information is corrected for a pixel in which the density level is lower than the mean value such that the density level is increased.

The size and the shape of the predetermined region are not limited as long as the predetermined region includes the near region of the edge part. When applying a standardized coding algorithm using DCT as the second coding algorithm, it is preferable to use a DCT block (8×8 pixel) which is a process unit of DCT as the predetermined region.

From the viewpoint of providing no change in the whole density state of the original image, the density information correction part corrects density information of each pixel in the near region such that the mean value of the density levels does not change.

According to such process, even when correction of density information is performed on each pixel for each block, the mean value of the density levels represented by the density information of pixels in a block is not changed.

From the viewpoint of being able to perform edge smoothing process of the original image relatively easily, the edge smoothing part may includes:

a smoothing matrix generation part for generating, for each block which includes the edge part or a near region of the edge part, a smoothing matrix which is used for matrix operation with a block density information vector, wherein the block density information vector is obtained by arranging density information of each pixel included in a block, and order of the block density information vector corresponds to the number of pixels in the block, and wherein the smoothing matrix includes coefficients used for edge smoothing which operate on density information of each pixel in the edge part or in the near region in the block; and a matrix operation part for obtaining smoothed density information of each pixel in the block by performing matrix operation by using the smoothing matrix and the block density information vector.

According to the image coding apparatus, smoothed density information of all pixels in the block can be obtained by performing matrix operation using the block density information vector and the smoothing matrix for each predetermined block.

As the predetermined block, a block including any number of pixels can be used. When a standardized coding algorithm using DCT is applied as the second coding algorithm, it is preferable to use a DCT block (8×8 pixel) which is a process unit of DCT as the predetermined block.

Since coefficients used for edge smoothing are arranged in the smoothing matrix generated for each block such that the coefficients operate on density information of each pixel in the edge part or in the near region in the block, the arrangement depends on the position of the edge part or the near region included in the block.

When performing the smoothing process for each predetermined block, there is a possibility that density information on a boundary of the blocks may be discontinued. From the viewpoint of preventing this problem, the edge smoothing part may include:

a pixel judgement part for judging whether a pixel exists in the edge part or in a near region of the edge part while scanning the original image pixel by pixel;

a matrix operation part for performing, when the pixel exists in the edge part or in the near region, matrix operation by using a block density information vector and a smoothing matrix, wherein the block density information vector is obtained by arranging density information of each pixel included in a block, the block includes the pixel and pixels in a surrounding region around the pixel, and order of the block density information vector corresponds to the number of pixels in the block, and wherein the smoothing matrix includes coefficients used for edge smoothing which operate on density information of each pixel in the block;

an operation part for obtaining smoothed density information of each pixel by overlaying density information of each pixel in the block obtained by performing the matrix operation on each pixel while scanning the original image pixel by pixel.

According to the image coding apparatus, since matrix operation and pixel overlaying are performed while scanning the original image pixel by pixel, the process can be performed continuously on the original image pixel by pixel, wherein the block density information and the smoothing matrix are used in the matrix operation.

From the viewpoint of providing a concrete configuration of the pixel judgement part, the pixel judgement part may include:

a distance conversion part for generating distance information representing distances between the edge part and each pixel; and a distance judgment part for judging whether the distance information for each pixel is equal to or smaller than a predetermined value;

wherein, when the distance information is judged to be equal to or smaller than the predetermined value, it is judged that a pixel corresponding to the distance information exists in the edge part or in the near region.

The second object can also be achieved by an image decoding apparatus which decodes coded information which includes coded edge information representing an edge part of an original image and coded density information representing an edge smoothed image, the image decoding apparatus including:

a first decoding part for obtaining edge information representing the edge part by decoding the coded edge information according to a first decoding algorithm;

a second decoding part for obtaining density information of the edge smoothed image by decoding the coded density information according to a second decoding algorithm;

an edge sharpening part for sharpening the edge part of the edge smoothed image by using the edge information such that a reproduced image is obtained.

According to the image decoding apparatus, by determining the first decoding algorithm and the second decoding algorithm such that they correspond to the first coding algorithm and the second coding algorithm respectively, the coded information obtained by the image coding apparatus can be properly decoded.

From the viewpoint of providing a concrete method of sharpening the edge smoothed image, the edge sharpening part may include a density information correction part for correcting density information of each pixel of the edge smoothed image such that variation of density levels represented by density information of pixels which are arranged across the edge part in a near region of the edge part of the edge smoothed image is increased.

Since the variation of density levels represented by the density information of pixels arranged across the edge part in the near region of the edge part of the edge smoothed image becomes large, abrupt change of the density levels appears so that the edge part is sharpened.

According to the image decoding apparatus, by determining the first decoding algorithm and the second decoding algorithm such that they correspond to the first coding algorithm and the second coding algorithm respectively, and by determining the degree of increasing the variation of the density levels such that it correspond to the degree of decreasing the variation of the density levels for obtaining the edge smoothed image, the coded information obtained by the image coding apparatus can be properly decoded.

The density information correction part may include:

a mean value calculation part for calculating a mean value of the density levels in a predetermined region; and a density level judgement part for judging whether the density level of a pixel is higher or lower than the mean value for each pixel in the near region;

wherein density information is corrected for a pixel in which the density level is higher than the mean value such that the density level is increased, and density information is corrected for a pixel in which the density level is lower than the mean value such that the density level is lowered.

From the viewpoint that the average density level is not changed when decoding, the density information correction part may correct density information of each pixel in the near region such that the mean value of the density levels does not change.

From the viewpoint of providing a concrete method of sharpening the edge smoothed image, the edge sharpening part may include:

a sharpening matrix generation part for generating, for each block the edge part or a near region of the edge part in the edge smoothed image, a sharpening matrix which is used for matrix operation with a block density information vector, wherein the block density information vector is obtained by arranging density information of each pixel included in a block, and order of the block density information vector corresponds to the number of pixels in the block, and wherein the sharpening matrix includes coefficients used for edge sharpening which operate on density information of each pixel in the edge part or in a near region of the edge part in the block; and a matrix operation part for obtaining sharpened density information of each pixel in the block by performing the matrix operation by using the sharpening matrix and the block density information vector.

According to the image decoding apparatus, the density information of each pixel in the block can be obtained in the edge sharpened image by performing matrix operation using the block density information vector and the sharpening square matrix.

The image decoding apparatus can be configured such that it is suitable for decoding the coded information obtained by the before-mentioned image coding apparatus. In such case, from the viewpoint of performing sharpening operation easily, the sharpening matrix generation part may generate an inverse matrix of a smoothing matrix as the sharpening matrix in which the smoothing matrix is used for obtaining density information of the edge smoothed image which is decoded from the coded density information.

According to the image decoding apparatus, the sharpening matrix used for sharpening the edge part of the edge smoothed image can be obtained by obtaining an inverse matrix of the smoothing matrix used for smoothing the original image.

From the viewpoint of providing a concrete method for sharpening the edge smoothed image, the edge sharpening part may include:

a pixel judgement part for judging whether a pixel exists in the edge part represented by the edge information or in a near region of the edge part while scanning the edge smoothed image pixel by pixel;

a matrix operation part for performing, when the pixel exists in the edge part or in the near region, matrix operation by using a block density information vector and a sharpening matrix, wherein the block density information vector is obtained by arranging density information of each pixel included in a block, the block includes the pixel and pixels in a surrounding region around the pixel, and order of the block density information vector corresponds to the number of pixels in the block, and wherein the sharpening matrix includes coefficients used for edge sharpening which operate on density information of each pixel in the block;

an operation part for obtaining sharpened density information of each pixel by overlaying density information of each pixel in the block obtained by performing the matrix operation on each pixel while scanning the edge smoothed image pixel by pixel.

According to the image decoding apparatus, the density information of each pixel in the block in the edge sharpened image can be obtained by matrix operation using the block density information block and the sharpening matrix while scanning the edge smoothed image pixel by pixel.

The image decoding apparatus can be configured such that it is suitable for decoding the coded information obtained by the before-mentioned image coding apparatus. In such case, from the viewpoint of performing sharpening operation easily, the sharpening matrix may be an inverse matrix of a smoothing matrix in which the smoothing matrix is used for obtaining density information of the edge smoothed image which is decoded from the coded density information.

According to the image decoding apparatus, the sharpening matrix used for sharpening the edge part of the edge smoothed image can be obtained as an inverse matrix of the smoothing matrix used for smoothing the original image.

The second object can be also achieved by an image decoding apparatus which decodes coded information of an image, the image decoding apparatus including:

an edge information obtaining part for obtaining edge information representing an edge part of the image;

a decoding part for obtaining density information of the image by decoding the coded information according to a predetermined decoding algorithm;

an edge sharpening part for sharpening the edge part represented by the edge information for the density information of the image such that a reproduced image is obtained.

The edge information obtaining part may obtain the edge information by receiving it from the outside directly or by decoding coded edge information.

In the latter case, the edge information obtaining part may include an edge decoding part for obtaining the edge information by decoding coded edge information which is provided to the image decoding apparatus according to a predetermined decoding algorithm.

BRIEF DESCRIPTION OF THE DRAWINGS

Other objects, features and advantages of the present invention will become more apparent from the following detailed description when read in conjunction with the accompanying drawings in which:

FIG. 4 shows an example of a distance map;

FIG. 7 shows an example of a smoothing filter;

FIGS. 8A-8C shows each example of a smoothing filter matrix, a unit matrix and a matrix for weight operation;

FIG. 9 shows an example of a sharpening filter matrix;

FIG. 11 shows an example of a smoothing filter;

FIG. 13 shows an example of a mask region used for the smoothing process;

FIG. 15 is a block diagram of other configuration example of an image transmission system including an image coding apparatus and an image decoding apparatus;

FIG. 16 is a block diagram of still other configuration example of an image transmission system including an image coding apparatus and an image decoding apparatus.

DETAILED DESCRIPTION OF THE PREFERRED EMBODIMENTS

In the following, embodiments of the present invention will be described with reference to figures.

Figure 1:
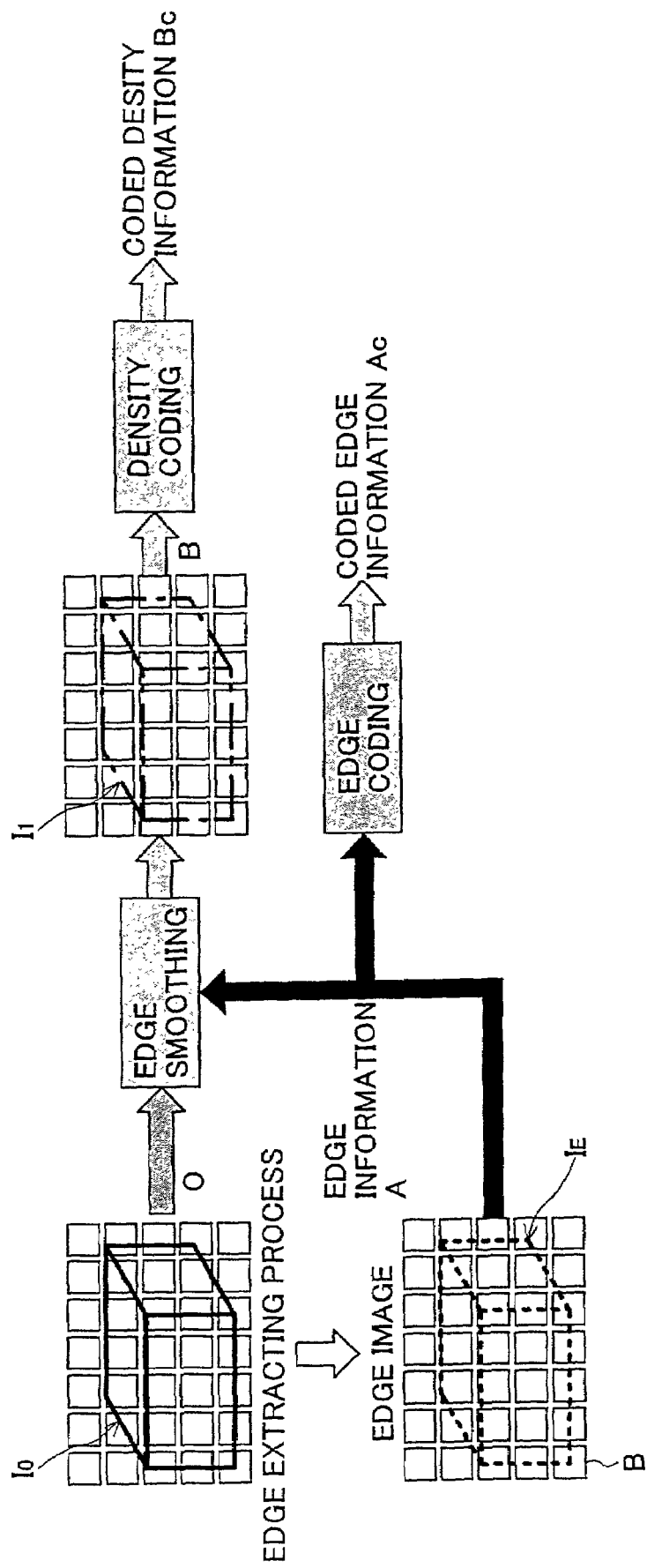
FIG. 1 is a figure showing a principle of processes of an image coding apparatus according to an embodiment of the present invention.

The principle of processes performed by an image coding apparatus of an embodiment of the present invention is as shown in FIG. 1 for example.

As shown FIG. 1, edge information A is extracted from an original image $I_O$ which is represented by density information O (for example, luminance level) for each pixel, in which the edge information A represents the edge part $I_E$ of the original image $I_C$. The extracted edge information A is coded according to a standard coding algorithm such as JBIG and the like so that coded edge information $A_C$ is obtained. From the extracted edge information A, processes for smoothing the edge part $I_E$ are performed on the density information representing the original image $I_O$ so that density information B of an edge smoothed image $I_1$ is obtained for each pixel. The density information B of the edge smoothed image $I_1$ is coded according to the standard coding algorithm such as JPEG so that coded density information $B_C$ is obtained. This image coding apparatus outputs the coded edge information $A_C$ and the coded density information $B_C$ as coded information.

According to this image coding apparatus, the edge part $I_E$ of the original image $I_O$ is smoothed for obtaining the edge smoothed image $I_1$ and the edge smoothed image $I_1$ is coded. Since the edge smoothed image $I_1$ has relatively small high spatial frequency components, information which is lost in coding can be decreased even when the standard coding algorithm using the DCT such as JPEG is used. In addition, when the edge smoothed image $I_1$ is coded by using DCT, efficiency of coding by DCT around the edge of the edge smoothed image $I_1$ can be improved. Thus, if the edge part $I_E$ is coded individually, degradation of coding efficiency can be prevented.

Figure 2:
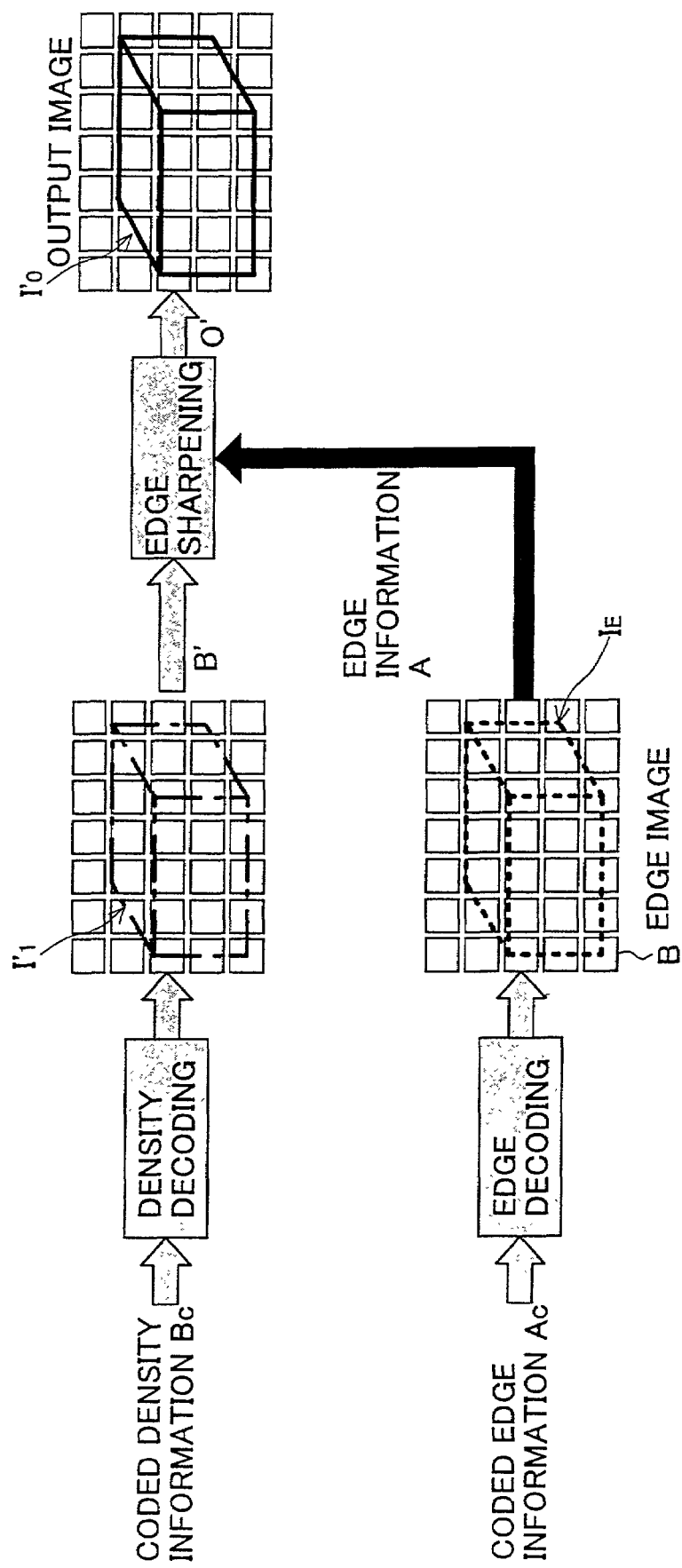
FIG. 2 is a figure showing principle of processes performed by an image decoding apparatus of an embodiment of the present invention.

In addition, the principle of processes performed by an image decoding apparatus of an embodiment of the present invention is as shown in FIG. 2 for example.

In FIG. 2, the coded edge information $A_C$ is decoded according to an standard decoding algorithm such as JBIG corresponding to the above-mentioned standard coding algorithm (JBIG, for example) so that edge information A representing the edge part $I_E$ of the original image is obtained. In addition, the coded density information $B_C$ is decoded according to an standard decoding algorithm such as JBEG corresponding to the above-mentioned standard coding algorithm (JPEG, for example) so that density information B' of the edge smoothed image $I'_1$ is obtained. Then, a sharpening process for sharpening the edge of the edge smoothed image $I'_1$ is performed on the density information B' of the edge smoothed image $I'_1$ by using the edge information A. Then, an image represented by density information O' of each pixel is obtained as a reproduced image $I'_O$ corresponding to the original image $I_O$.

As mentioned above, in the image decoding apparatus, the coded edge information $A_C$ and the coded density information $B_C$ obtained as the coded information are decoded, in which the coded density information $B_C$ corresponds to the edge smoothed image. By decoding the coded edge information A, the edge information corresponding to the edge part of the original image $I_O$ can be reproduced. Then, the edge part of the edge smoothed image $I'_1$ which is obtained by decoding the coded density information $B_C$ is sharpened by using the edge information obtained in the above-mentioned way so that the reproduced image $I'_O$ can be obtained.

As for the edge smoothed image $I_1$ obtained in the image coding apparatus, although spatial resolution around the edge is degraded, intrinsic visual information in the image signal (density information) is not largely lost. Therefore, even when the sharpening process for the edge of the edge smoothed image $I_1$ is not performed, an image having a certain quality can be obtained. Thus, the edge information can be used as enhanced information of the original image. For example, in a system in which coded information is transmitted from the image coding apparatus to the image decoding apparatus, when information can not be transmitted sufficiently due to network congestion, only the coded density information of the edge smoothed image $I_1$ may be transmitted as the coded information. Accordingly, the image transmission system can be configured such that the edge information is used as necessary.

In this case, whether the coded edge information is transmitted or not can be determined by negotiation between the image coding apparatus and the image decoding apparatus. In addition, by assigning priorities to the coded edge information and the coded information of the edge smoothed image and by IP-packeting these information, it becomes possible to transmit high priority information to a decoding side accurately in internet routers.

Next, an example which includes the image coding apparatus and the image decoding apparatus of an embodiment of the present invention will be described.

Figure 3:
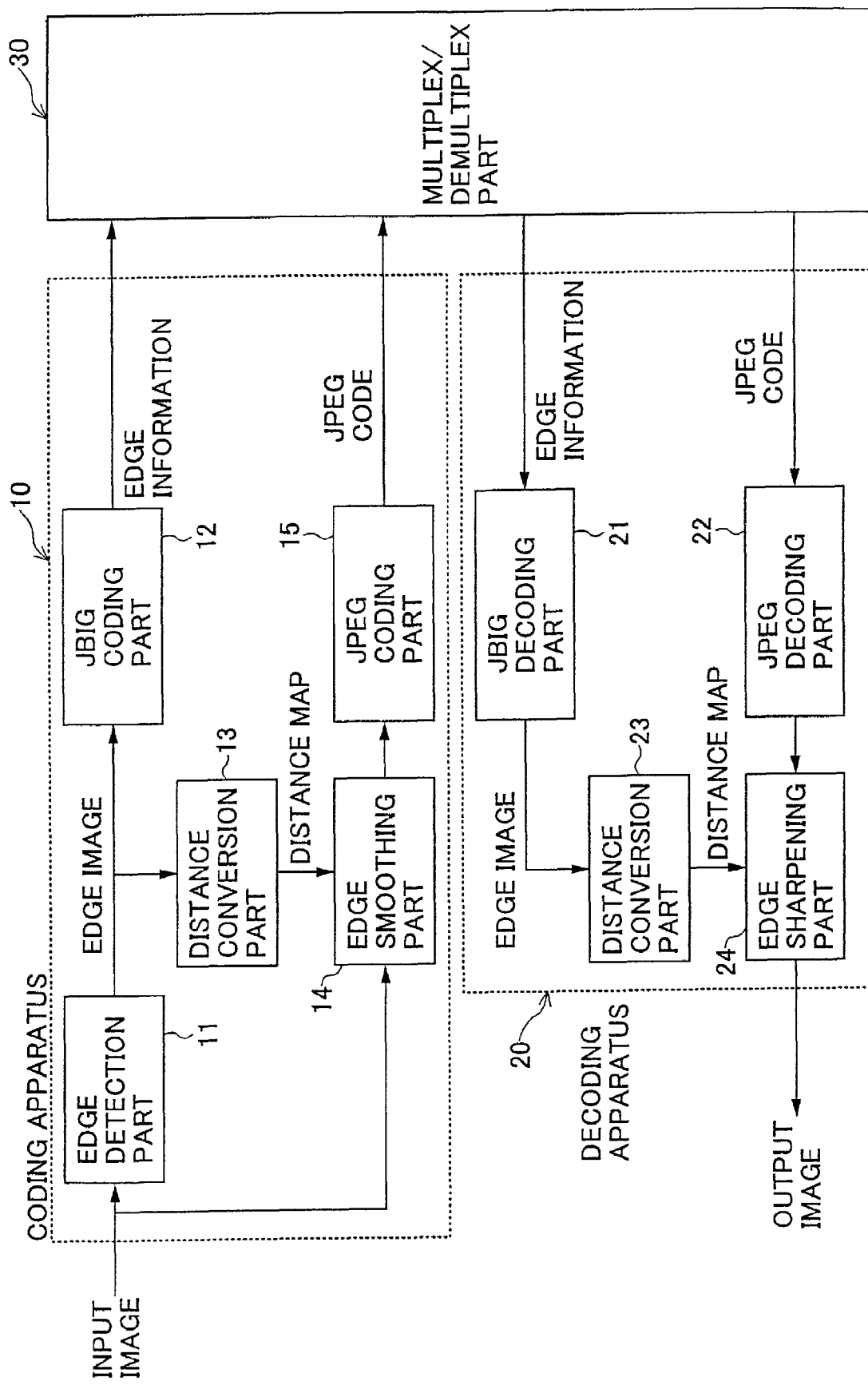
FIG. 3 is a block diagram of an image transmission system including an image coding apparatus and an image decoding apparatus according to an embodiment of the present invention.

This image transmission system is configured as shown in FIG. 3 for example. In this example, the image coding apparatus 10 and the image decoding apparatus 20 perform compression and extension of a still image by using a standardized still image coding method and decoding method such as JPEG and the like. The image coding apparatus 10 includes functions for heightening compression efficiency for regions around step edges such as subject edge and character region and for separating edge information from the original image and sending the edge information hierarchically. According to these functions, subjective quality around the edge of the image obtained by decoding by the image decoding apparatus 20 can be improved.

In FIG. 3, in the image transmission system, the coded information (coded edge information and coded density information) of the original image is transmitted from the image coding apparatus 10 to the image decoding apparatus 20 via a transmission line 30. Then, the image decoding apparatus 20 decodes the coded information so that the reproduced image is obtained.

The image coding apparatus 10 includes an edge detection part 11, a JBIG coding part 12, a distance conversion part 13, an edge smoothing part 14 and a JPEG coding part 15. The edge detection part 11 detects an edge part from an input image (original image), and outputs edge information representing the edge part. A conventionally known method can be applied as a detection method in the edge detection part 11. For example, a generic method such as operators of Sobel can be used, in addition, a process for optimizing detection accuracy of edges to be smoothed can be applied in consideration of continuity of edge. The information output from the edge detection part 11 is binary information of white and black.

The JBIG coding part 12 performs undistortion (reversible) compression on the edge information which is binary information and output from the edge detection part 11 according to the JBIG coding method. In addition, the edge information is converted into a distance map by the distance conversion part 13. The distance conversion process performed by the distance conversion part 13 is a process for obtaining distribution of each distance between a position (i,j) and a position (m,n) on the image. For example, distance between an pixel of the edge part to the adjacent pixel is represented by distance $d(f_{ij}, f_{mn})$ which is defined by Euclidean distance, 4-adjacent distance, 8-adjacent distance and the like. The distance map in indicates a state of distance values from the pixels of the edge part to the adjacent pixels. For example, when the distance value is defined by the 4-adjacent distance $(d(f_{ij}, f_{mn})=|i-m|+|j-n|)$, a distance map shown in FIG. 4 can be obtained. In FIG. 4, each rectangular region represents a pixel and the diagonally shaded rectangular region are pixels of the edge part.

For example, as shown in FIG. 4 for any particular row of pixels, a particular pixel is labeled with a numeral, indicating the distance value away from the edger part. For example, with regard to row 1, the pixel labeled "4" is four pixels removed from the edge part. The next pixel is labeled "3" and is three pixels removed from the edger part, and so on.

The edge smoothing part 14 receives the distance map (FIG. 4, for example) from the distance conversion part 13 and receives the input image (original image), and performs smoothing process for the part close to the edge in the image so that the edge smoothed image is obtained. The details of the smoothing process will be described later. According to this smoothing process, the edge part including step edge and the like where the density changes abruptly is smoothed.

The JPEG coding part 15 encodes the density information representing the edge smoothed image received from the edge smoothing part 14 according to JPEG. In this coding process, DCT and quantization are performed. Since these processes are performed on the edge smoothed image, image quality degradation which is visually conspicuous such as block distortion, mosquito noise and the like in the decoded image due to quantization of the DCT coefficients can be suppressed, and a code amount for coding can be decreased.

The image coding apparatus 10 outputs the coded edge information from the JBIG coding part 12 and JPEG codes which is the coded density information corresponding to the coded edge information from the JBIG coding part 12 as the coded information. At this time, the coded information and synchronization information for identifying the same frames are multiplexed. The multiplexed information is transmitted from the image coding apparatus 10 to the image decoding apparatus 20 via the transmission line 30.

In the following, the process in the edge smoothing part 14 will be described concretely.

In this process, a smoothing filter matrix having an inverse matrix is applied for pixels included in a region near edge (edge near region) defined by the distance map (FIG. 4). In matrix operation, a method of overlapping operation is used for suppressing visual effects in boundaries of pixel blocks on which the smoothing filter matrix operates.

Figure 5:
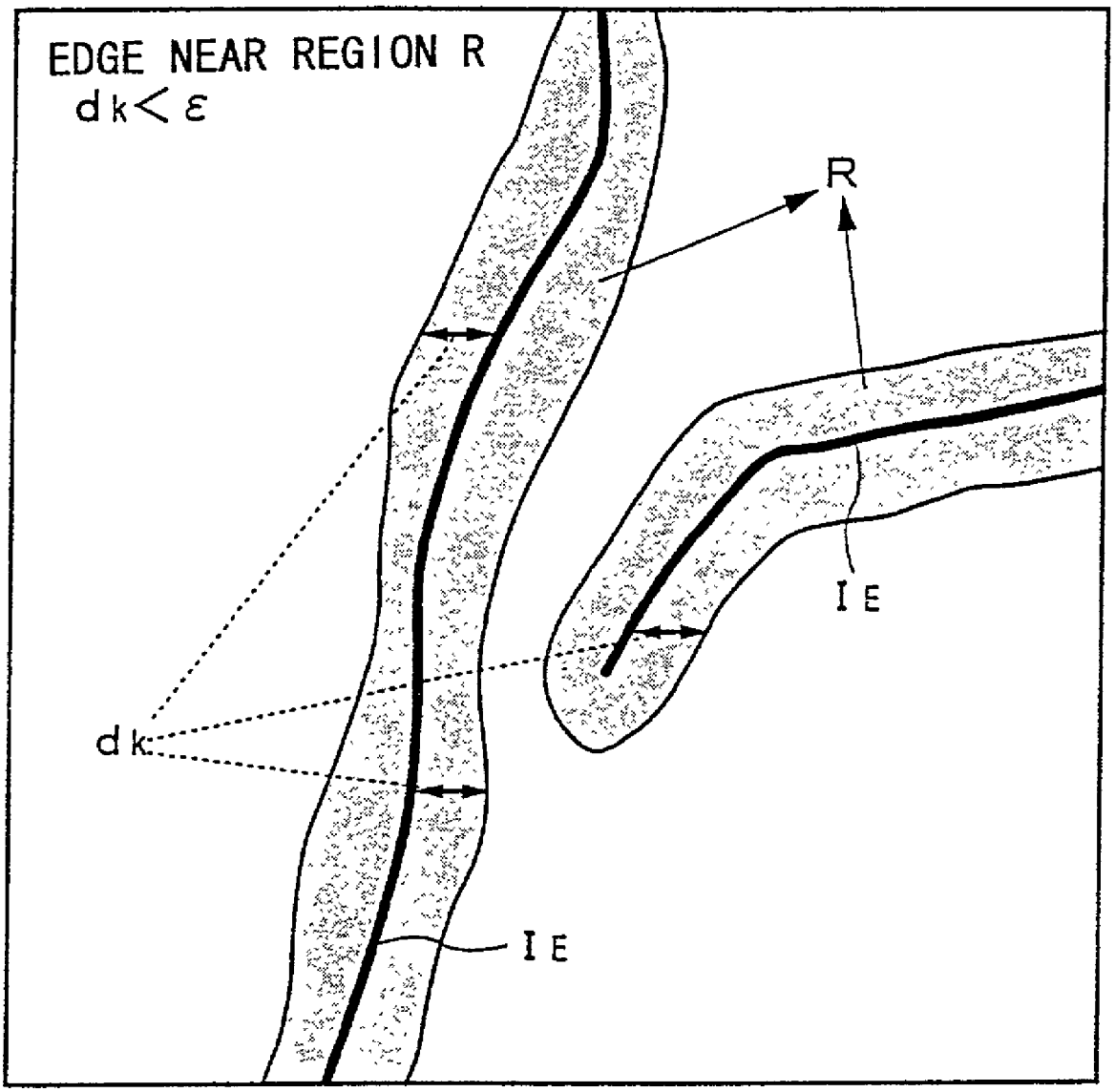
FIG. 5 shows an example of an edge near region R.

First, assuming that a sample (pixel) of a pixel position (i,j) of the input image is $p_{ij}$ and a distance value of the pixel position (i,j) on the distance map (FIG. 4) is $d(p_{ij})$. In addition, an edge near region R is defined as $R=\{p_{ij}|d(p_{ij})<\epsilon\}$ as shown in FIG. 5. The smoothing process is performed to every $p_{ij}$ in the edge near region R.

Figure 6:
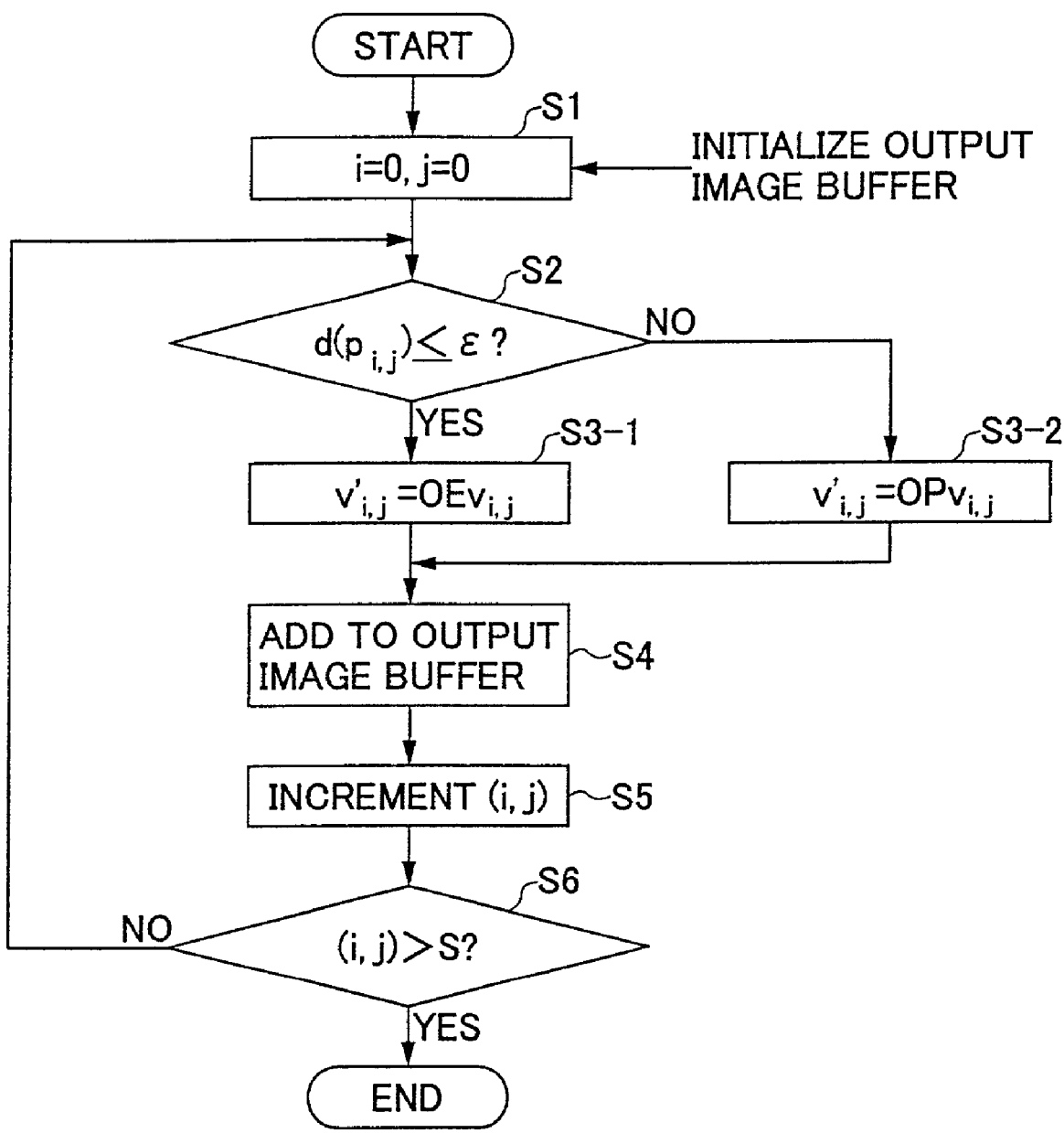
FIG. 6 is a flowchart showing an example of a smoothing process in the image coding apparatus.

The smoothing process is performed according to a procedure shown in FIG. 6 for example.

As shown in FIG. 6, the pixel position (i,j) is initialized (i=0, j=0) and all values in an output image buffer are initialized to 0 in step S1. In this state, it is judged whether the pixel $p_{ij}$ is included in the edge near region R while scanning the input image pixel by pixel (incrementing i, j) in step S2. More particularly, it is judged whether the distance value $d(p_{ij})$ of the pixel satisfies $d(p_{ij})<\epsilon$. When it is judged that the pixel $p_{ij}$ is included in the edge near region R in step S2 (YES), an matrix operation $v'_{ij}=OEv_{ij}$ is performed in step S3-1 wherein $v_{ij}$ represents a ninth order pixel block vector $V_{ij}=\{I(p_{i-1,j-1}), I(p_{i,j-1}), \ldots, I(p_{i+1,j+1})\}$ obtained by arranging image values I (density information) of nine pixels in a 3×3 pixel block including the pixel $p_{ij}$ as the center, and E represents a ninth order smoothing filter matrix which is regular and defined for smoothing.

Figure 7:
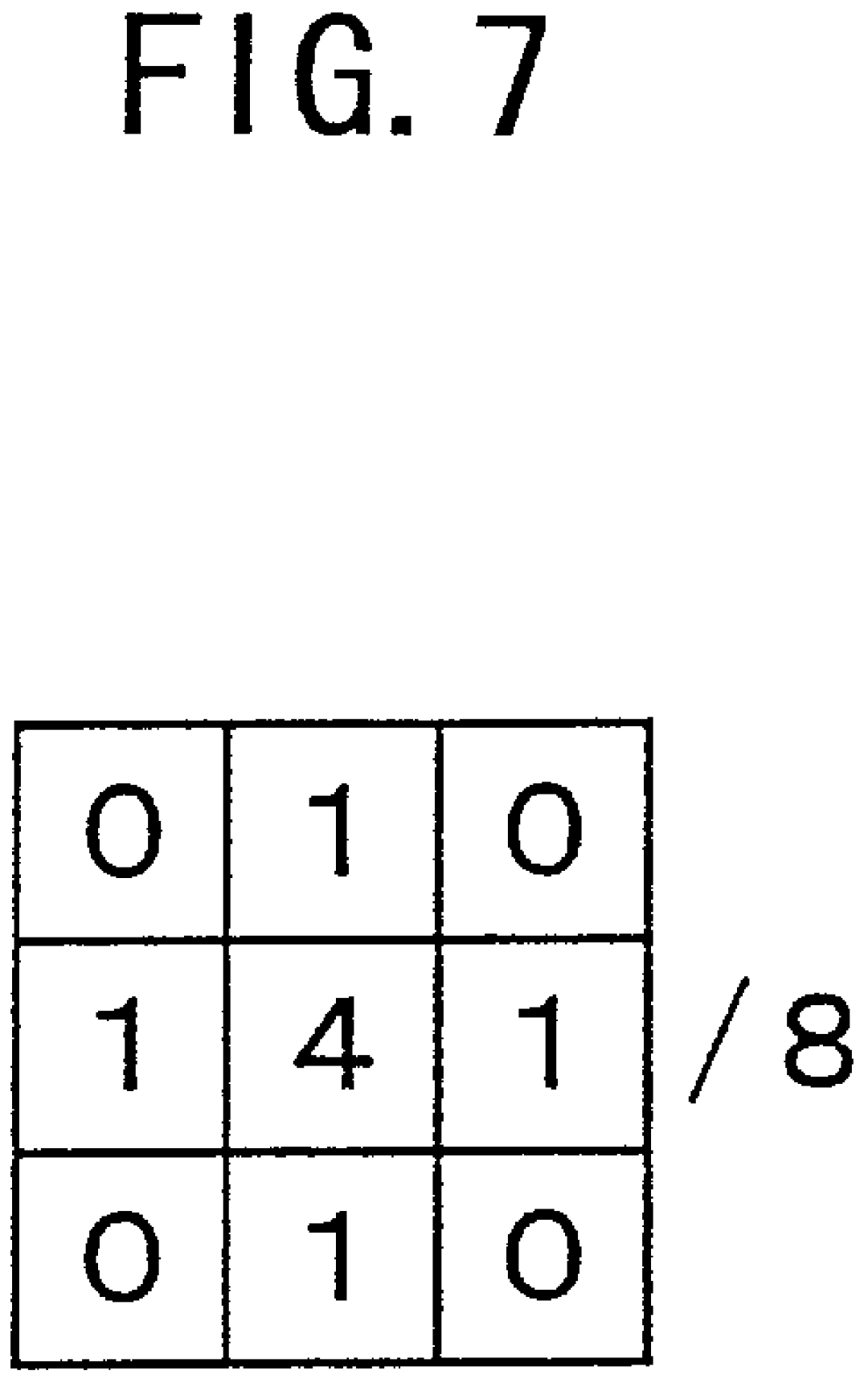

The smoothing filter matrix E is arranged such that each coefficient in the smoothing filter shown in FIG. 7 is operated to each pixel value included in the pixel block vector $v_{ij}$ by the matrix operation ($Ev_{ij}$). That is, the smoothing filter E is a regular matrix of 9×9 order shown in FIG. 8A. Although the 9×9 order regular matrix is used for the smoothing filter matrix E, it is not limited to this. The order of E can take any value as long as the value is the same as the order of the pixel block vector $v_{ij}$ which is the unit of the matrix operation. In addition, the coefficients can be set according to the needed smoothing operation. Accordingly, the smoothing filter matrix E can be defined freely on condition that the inverse matrix used for after-mentioned decoding exists.

To perform matrix operation between the smoothing matrix E in which coefficients of the smoothing filter (FIG. 7) are arranged and the pixel block vector $v_{ij}$ is equivalent to that the smoothing filter (FIG. 7) is operated on the pixel $p_{ij}$ included in the 3×3 pixel block as the center. Therefore, according to the matrix operation, smoothing for the pixel $p_{ij}$ is performed.

On the other hand, when it is judged that the pixel $p_{ij}$ is not included in the edge near region in step 2 (NO), an operation $v'_{ij}=OPv_{ij}$ using the pixel block vector $v_{ij}$ and a ninth order unit matrix P shown in FIG. 8B is performed in step S3-2. When the unit matrix P is operated on the image block vector $v_{ij}$, the pixel block vector $v_{ij}$ is not changed ($Pv_{ij}=v_{ij}$). Therefore, in this case, the smoothing process is not performed.

The matrix O used for the matrix operations $v'_{ij}=OEv_{ij}$ and $v'_{ij}=OPv_{ij}$ is configured as shown in FIG. 8C. Since the above-mentioned operation is performed by shifting the pixel $p_{ij}$ one by one, the smoothing process is performed while the smoothing filter (FIG. 7) corresponding to the 3×3 pixel block is overlapped (while each pixel becomes the center pixel of the 3×3 pixel block or becomes a surrounding pixel). The matrix O is for providing weight assigned in the overlapping operation.

An operation result $v'_{ij}=\{I'(p_{i-1,j-1}),I'(p_{i,j-1}), \ldots, I'(p_{i+1,j+1})\}$ obtained by the matrix operation represents each pixel value I' after performing smoothing process for each pixel of the 3×3 pixel block. The pixel value $I'(p_{mn})$ is added on the output image buffer for each pixel $p_{mn}$ in step S4.

After that, i and j are incremented for shifting the sample pixel in step S5. In addition, it is judged whether each of i and j exceeds S indicating the last pixel of the input image in step S6. When each of i and j does not exceed S, the above-mentioned steps (S2, S3-1 or S3-2, S4, S5, S6) are performed repeatedly. As a result, the smoothing process is performed for the pixels $p_{ij}$ included in the edge near region R while scanning the input image pixel by pixel. After that, when each of i and j exceeds S, the smoothing process ends. The values I' of the pixels stored in the output pixel buffer at the end time becomes the density information (pixel value data) representing the edge smoothed image.

As shown in FIG. 3, the image decoding apparatus 20 includes a JBIG decoding part 21, a JPEG decoding part 22, a distance conversion part 23, and an edge sharpening part 24. The image decoding apparatus 20 receives the coded edge information and the JPEG code (coded density information) corresponding to the edge smoothed image where they are separated, wherein the coded edge information and the JPEG code (coded density information) are sent from the image coding apparatus 10 as the coded information.

The JBIG decoding part 21 generates edge information by decoding the received coded edge information according to the decoding method of JBIG. The JPEG decoding part 22 decodes the received JPEG codes according to the decoding method of JPEG so that density information representing the edge smoothed image is generated. The distance conversion part 23 generates a distance map (FIG. 4) on the basis of the edge information from the JBIG decoding part 21 in the same way performed by the distance conversion part 13 in the image coding apparatus 10. Then, the edge sharpening part 24 performs sharpening for the edge part in the edge smoothed image from the JPEG decoding part 22 on the basis of distance value of each pixel of the edge near region, that is, the edge sharpening part 24 performs intensity restoration of the edge part.

In the edge sharpening part 24, following edge sharpening process is performed for example.

In the process, a sharpening filter matrix $E^{-1}$ which is an inverse matrix of the smoothing filter matrix E is operated on the pixels included in the edge near region which is defined by the distance map. The process procedure is similar to that shown in FIG. 6. In step S3-2 in FIG. 6, instead of the smoothing filter matrix E, the sharpening filter matrix $E^{-1}$ configured as shown in FIG. 9 is used for matrix operation.

That is, while scanning the edge smoothed image pixel by pixel, a matrix operation $v_{ij}=OE^{-1}v'_{ij}$ is performed, wherein a ninth order pixel block vector $v'_{ij}=\{I'(p_{i-1,j-1}),I'(p_{i,j-1}), \ldots, I'(p_{i+1,j+1})\}$ and the sharpening filter matrix $E^{-1}$ are used. The ninth order pixel block vector $v'_{ij}$ is obtained by arranging pixel values of each pixel included in a 3×3 pixel block having a pixel $p_{ij}$ as the center which is included in the edge near region. As a result, sharpening is performed for the pixel $p_{ij}$.

Then, at the time when the above-mentioned process ends for every pixel in the edge smoothed image, pixel values of pixels stored in the output image buffer becomes the density information corresponding to the original image. The density information is output to the image decoding apparatus 20 as output image information.

According to the above-mentioned image transmission system, the image coding apparatus 10 detects edge position of the original image (input image) and performs the smoothing process on pixels near the edge. Thus, loss of information at the time of coding due to the edge are prevented, and degradation of coding efficiency can be prevented. In addition, since the smoothing of the edge is performed by the matrix operation using the smoothing filter matrix which has an inverse matrix mathematically, sharpening of edge can be performed easily by performing the inverse operation of the smoothing process by the image decoding apparatus 20, that is, intrinsic resolution of the edge region can be restored.

In addition, the output corresponding to the edge smoothed image from the JPEG decoding 22 in the image decoding apparatus 20 can be used for displaying an image and the like as image data (density information). The edge information can be used for restoring edge intensity as necessary. This means that texture of the edge part can be restored by adding an edge sharpening function to a product which complies with the standard image coding method which is widely distributed currently. Therefore, a system which performs compression and extension of an image can be realized without largely changing basic structure of an image encoding apparatus which supports existing standard image coding method. Since the amount of processing corresponding to the function to be added for restoring edge intensity is smaller than that of the compression coding processing such as JPEG and the like, the function can be added to the image decoding apparatus as a software module for example.

Next, other examples of the edge smoothing part 14 in the image coding apparatus 10 and the edge sharpening part 24 in the image decoding apparatus 20 will be described.

First, the edge smoothing part 14 divides the input image (original image) into N×N pixel blocks B (for example, 8×8 pixel DCT blocks), and performs following processes for each block B which includes the edge part of the original image. The block to be processed may include a plurality of edge parts.

Assuming that a pixel value (density information: luminance (brightness) value) of a pixel k in the block B is $I_k$(k∈B). A mean value $E_B$ of the luminance values $I_k$ of the pixels in the block B is calculated. Then, on the basis of the distance value $d_k$ of each pixel of the distance map (FIG. 4) generated in the distance conversion part 13, it is judged whether the pixel k is within the edge near region ($d_k$<ε). When the pixel k is judged to be within the edge near region R, the luminance value $I_k$ of the pixel k is corrected according to the distance value $d_k$.

The mean value $E_B$ is not limited for calculated on the basis of the block B. The mean value $E_B$ can be also calculated on the basis of luminance values of pixels in a predetermined region including an edge part.

Figure 10:
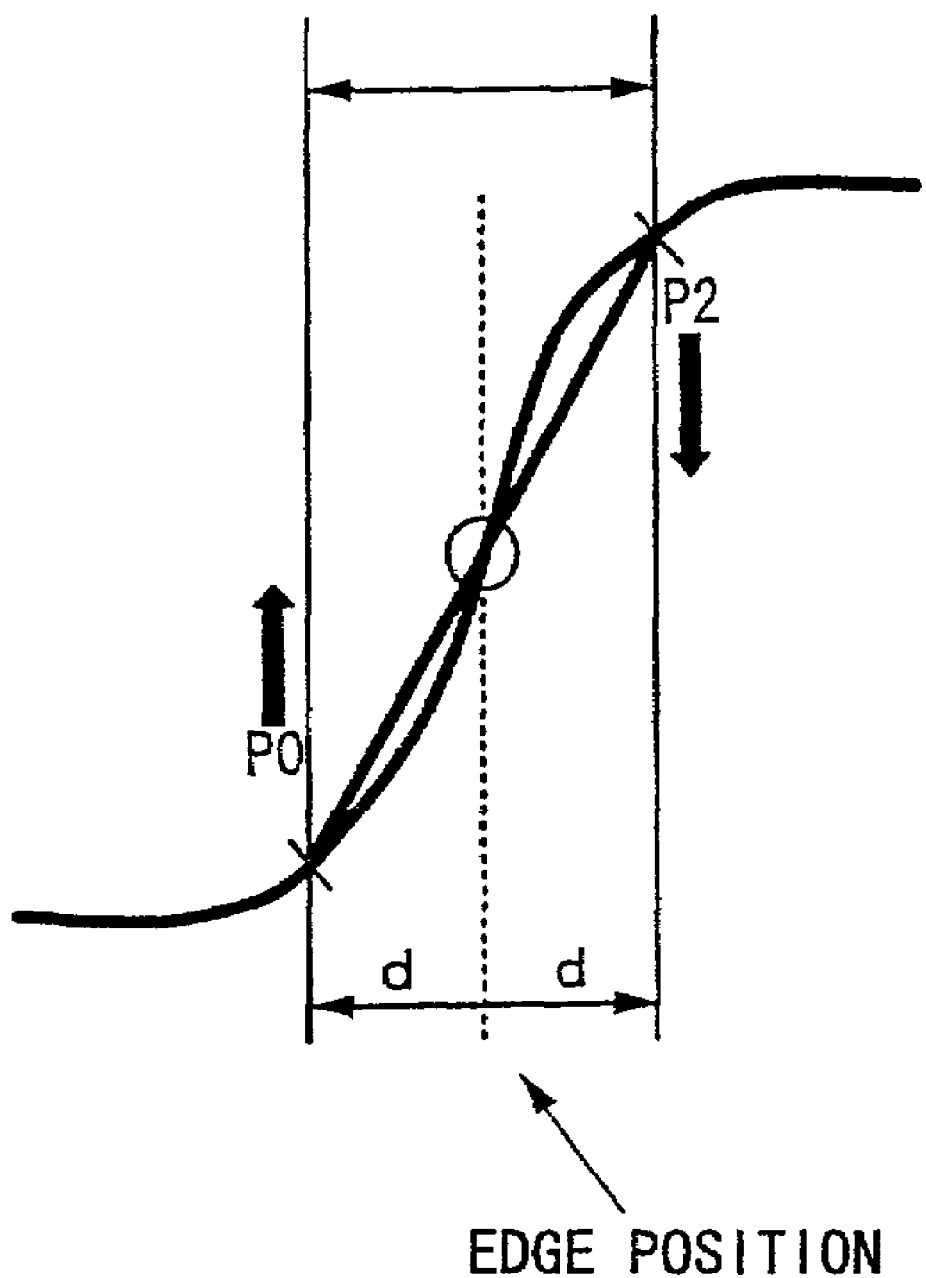
FIG. 10 shows an example of a method of correcting luminance in a smoothing process.

In the luminance correction, it is judged whether the luminance value $I_k$ of the pixel k in the block B is higher or lower than the mean value $E_B$. Then, as shown in FIG. 10, when a luminance value of a pixel $p_2$ is judged to be higher than the mean value $E_B$, the luminance value of the pixel $p_2$ is decreased (↓) On the other hand, when a luminance value of a pixel $p_0$ is judged to be lower than the mean value $E_B$, the luminance value of the pixel $p_0$ is increased (↑). Then, the correction (decrease, increase) of the luminance value is performed such that a mean value $E'_B$ of luminance values $I'_k$ of the pixels in the block B after correction (before smoothing) becomes the same as the mean value $E_B$, and such that the correction (decrease, increase) is inversely proportional to the distance value $d_k$ (distance from the edge part) of each pixel k.

More particularly, a corrected luminance value $I_k$ of a pixel is calculated according to the following procedure for each pixel, wherein α is a constant which satisfies 0<α<1.

If($I_k$<$E_R$) then
$I'_k = I_k + (E_R - I_k)*(1 - \alpha d_k)$
else if($I_k$>$E_R$) then
$I'_k = I_k - (I_k - E_R)*(1 - \alpha d_k)$ According to this procedure, the luminance value $I_k$ of the pixel k having distance $d_k$ in the edge near region R is corrected such that the luminance value $I_k$ moves closer to the mean value $E_k$ by a weighted difference between the means value $E_R$ and the luminance value $I_k$ in which a weight is assigned to the difference according to the distance.

According to this process, the luminance values of pixels which are arranged across the edge part are corrected such that variation of the luminance values of the pixels becomes small (that is, such that the luminance value moves closer to the mean value $E_B$). Therefore, variation of luminance of the edge part becomes small so that the edge part is smoothed.

In the edge sharpening part 24 in the image decoding apparatus 20 which sharpens the edge smoothed image which is obtained by smoothing according to the above-mentioned procedure, processes are performed similarly to the smoothing processes.

The edge smoothed image obtained by the JPEG decoding part 22 is divided into N×N pixel blocks B like the above-mentioned way and each of the blocks is processed. That is, in a block B including an edge part, a luminance value $I'_k$ of a pixel k in an edge near region is-corrected such that the luminance value $I'_k$ is increased when the luminance value $I'_k$ is larger than a mean value $E'_B$ of luminance values of the block B, and the luminance value $I'_k$ is decreased when the luminance value $I'_k$ is smaller than the mean value $E'_B$. More specifically, the luminance value $I_k$ of each pixel after correction (after sharpening) is calculated by $$I_k = \frac{I'_k - E'_R * (1 - \alpha d_k)}{\alpha d_k} \text{ and } E'_R = \frac{1}{N} \sum_{k \in R} I'_k.$$

According to the sharpening process, the luminance values of pixels which are arranged across the edge part are corrected such that variation of the luminance values becomes large (that is, such that the luminance value moves away from the mean value $E_B$) in the edge near region in the edge smoothed image. Therefore, variation of luminance of the edge part in the edge smoothed image becomes large so that the edge part is sharpened (edge intensity is restored).

In the next example, the edge smoothing part 14 in the image coding apparatus 10 divides an input image (original image) into 8×8 pixel blocks B (DCT blocks), and performs following processes for each block B including the edge part of the original image. The block B to be processed may include a plurality of edge parts.

A smoothing filter matrix A which is a 64×64 order square matrix is generated on the basis of the edge information from the edge detection part 11 and the distance map from the distance conversion part 13, wherein the smoothing filter matrix A is operated on a 64 order pixel block vector v which is obtained by arranging pixel values I (density information) of pixels (64 pixels) included in the block B (8×8 pixel block) which includes the edge part. The configuration of the smoothing filter matrix A depends on the position of the edge included in the block B.

Figure 11:
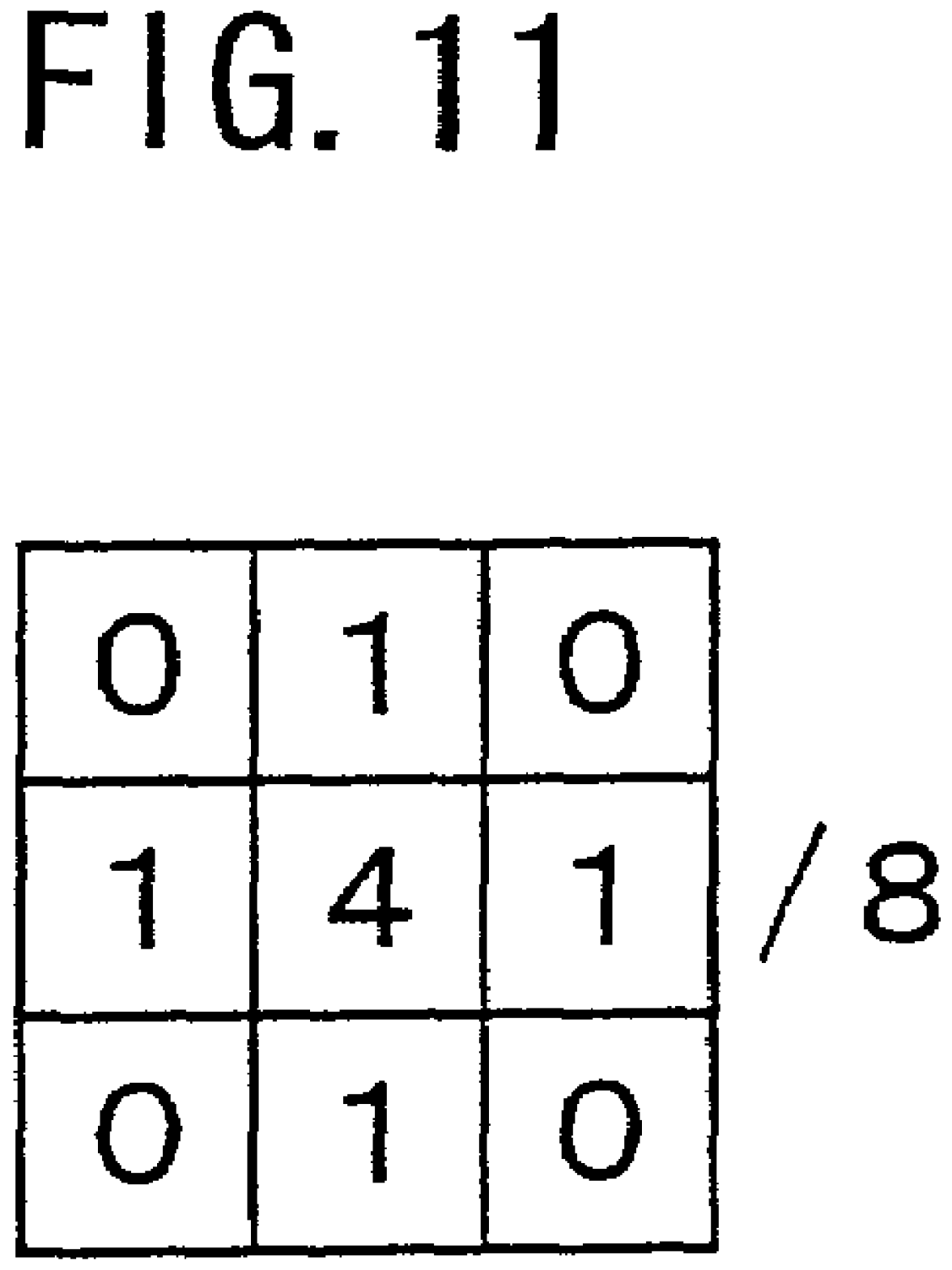

In the smoothing filter matrix A, coefficients are arranged such that matrix operation between the matrix A and the pixel block-vector v is equivalent to that smoothing process by a smoothing filter of 3×3 pixel block (FIG. 11 for example) is performed on a pixel in an edge part or in the near region (in diagonally shaded area in FIG. 4 for example) in the 8×8 pixel block.

Figure 12:
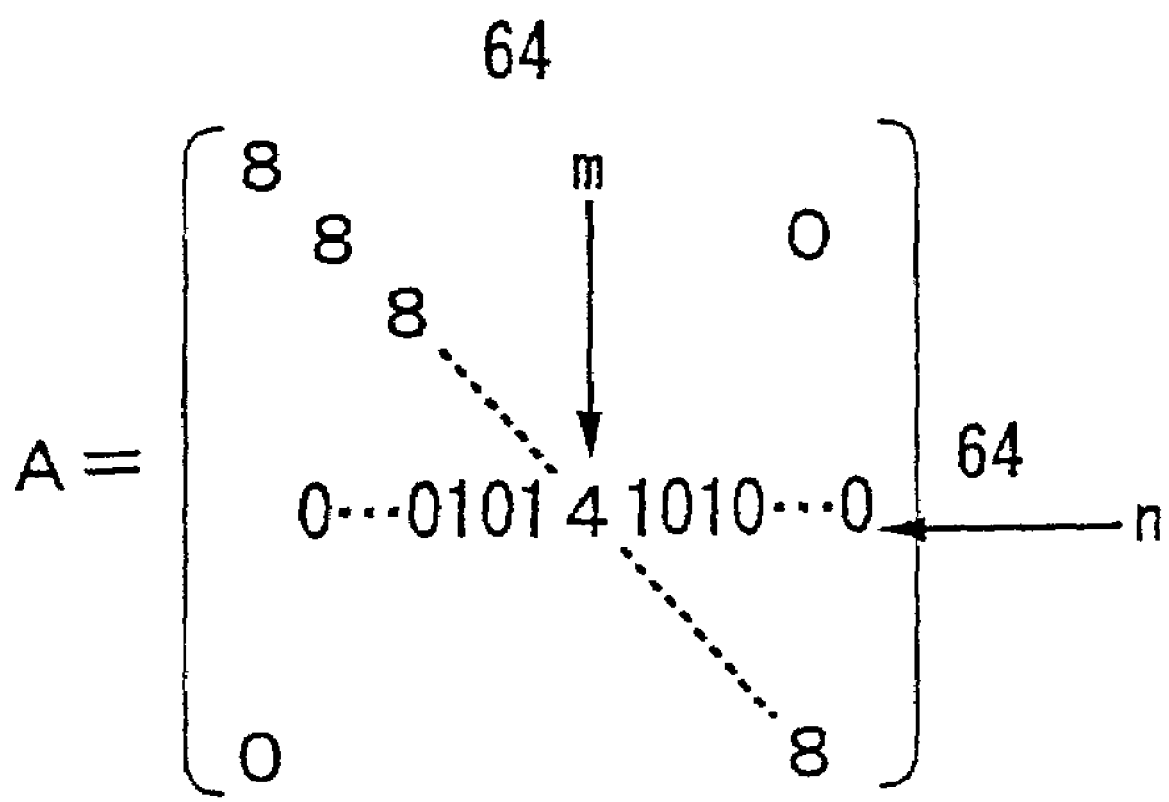
FIG. 12 shows another example of a smoothing filter matrix.

More particularly, the smoothing filter matrix A is configured as shown in FIG. 12. The configuration of the smoothing filter matrix A is for a case where only a pixel of a position (m,n) is included in the edge part or the near region.

After the smoothing filter matrix A is obtained on the basis of the edge information and the distance map, the matrix operation v'=Av is performed wherein the pixel block vector v corresponding to the block B and the smoothing filter matrix A are used. Each element of a vector v' (corrected pixel value) obtained by the matrix operation becomes a pixel value of each pixel in a block after smoothed is performed. Accordingly, the smoothing process is performed in the block.

The configuration of the smoothing filter matrix A (FIG. 12) and the configuration of the considered smoothing filter (FIG. 11) are not limited to the above-mentioned examples. These may vary as necessary.

In the edge sharpening part 24 in the image decoding apparatus 20 which performs sharpening of the edge smoothed image which is obtained by the smoothing process according to the above-mentioned procedure, processes are performed according to the similar procedure to the above-mentioned smoothing process. For the sharpening process, a sharpening filter matrix $A^{-1}$ which is an inverse matrix of the smoothing filter matrix A is generated for each block (8×8 pixel block) on the basis of the edge part and the near region in the block which are defined by the edge information and the distance map. Then, pixel values of an edge sharpened image (where edge intensity is restored) are obtained by a matrix operation $v = A^{-1}v'$ for each of blocks of the edge smoothed image, wherein the matrix operation uses a pixel block vector v' configured by pixel values of pixels included in each block and the sharpening filter matrix $A^{-1}$.

In such image coding/decoding method, it is necessary to generate the smoothing filter matrices A and the inverse matrices $A^{-1}$ corresponding to edge positions for each block. However, a filter which has eighth order tap at the maximum vertically and horizontally can be configured, desired smoothing characteristics can be obtained.

In the next example, the edge smoothing part 14 in the image coding apparatus 10 calculates smoothed pixel values x' of each pixel p by performing following processes on pixel values x (density information) of each pixel p (p∈R) which are judged to be within the edge near region (FIG. 5) in the input image (original image).

Figure 13:
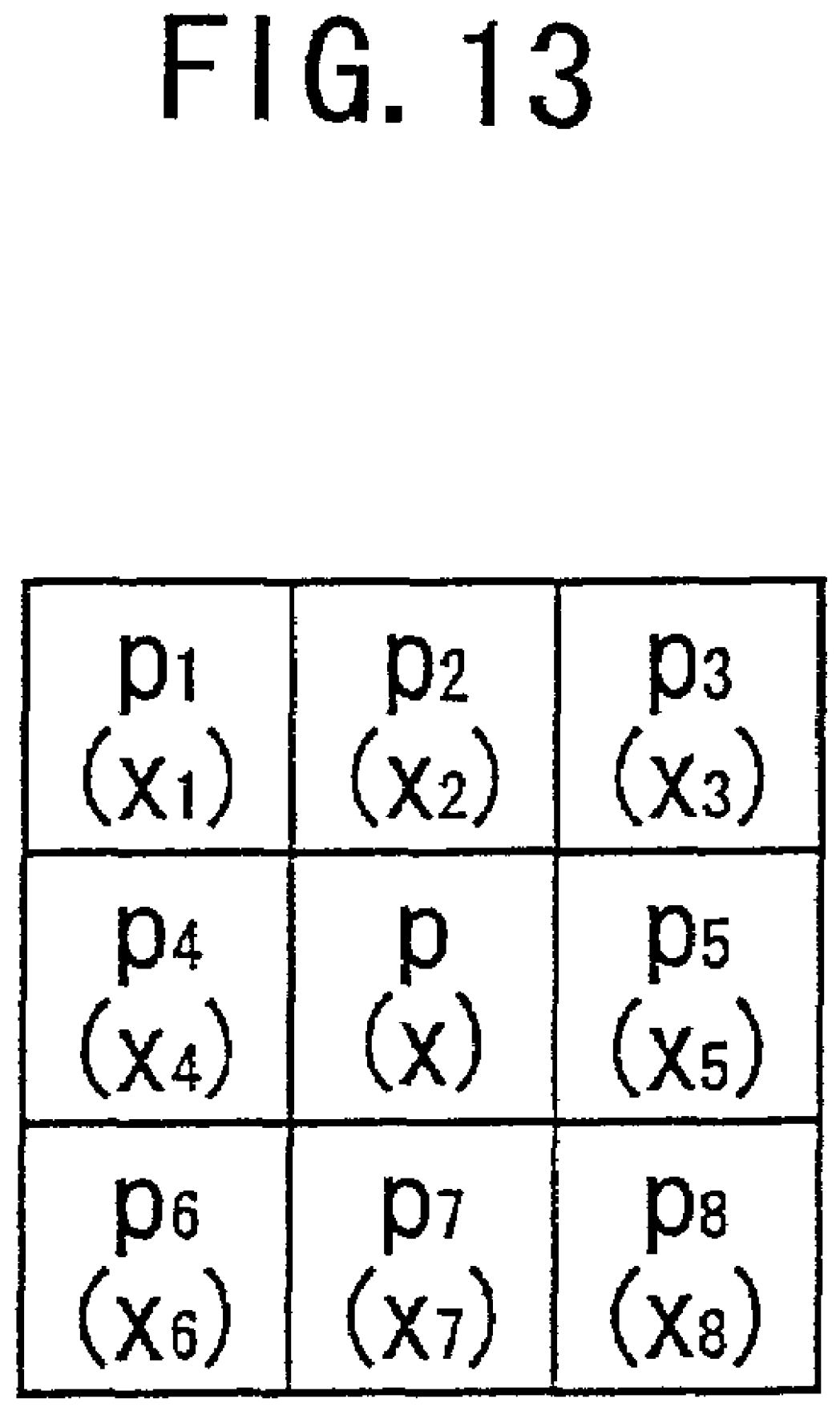

For example, as shown in FIG. 13, a mask region of 3 pixels×3 pixels is defined where the pixel p is centered, and a mean value C of pixel values $x_1$-$x_8$ of eight pixels p1-p8 around a pixel p in the mask region. Then, a pixel value x' of the pixel p which is smoothed is obtained by x'=(1−λ)x+λC (equation 1) in consideration of the mean value of the pixel values $x_1$-$x_8$ the surrounding pixels. In the equation, λ is a positive constant equal to or smaller than 0.5 and can take any value within this range. As the value λ becomes greater, ratio of the pixel value (mean value C) of surrounding pixels which is reflected to the pixel value x' becomes larger so that the degree of smoothing becomes greater. Although the mean value of the pixel values of the eight pixels $p_1$-$p_8$ around the pixel p is used as the value of C in this example, C can be determined by using other methods as long as density state of surrounding pixels is reflected. In this case, the value of λ can be determined as a positive number according to the method of determining C.

In the image decoding apparatus 20, the edge sharpening part 24 sharpens the edge part of the edge smoothed image (the edge smoothed image output from the JPEG decoding part 22) obtained by the above-mentioned smoothing process. The sharpening process is performed in the following way for example.

Original pixel values x are restored, in which the relationship between the original pixel values x and the pixel values x' of pixels of the edge near region R is represented by the equation 1, wherein the pixel values x' are obtained from the edge information from the distance conversion part 23. In this case, since the subject to be processed is the edge smoothed image, the same value as the mean value C used for the smoothing process can not be used as a mean value C of the pixel values of the surrounding pixels in this process, wherein the input image (original image) is processed in the smoothing process. Therefore, the original image values x are restored by repeating operation complying with the steepest-descent method. When assuming that the restored pixel value is $\hat{X}$, since $$\hat{x} + \frac{1}{1-\lambda}(\lambda C - x') = 0$$

is satisfied from the equation 1, $$e(X) = \left(X + \frac{1}{1-\lambda}(\lambda C(n) - x')\right)^2$$

(equation 2) is defined. Then, the restored pixel value is defined as X which minimizes e(X). Since C is changed depending on calculation process of X, C is described such that the value depends on the number of repetition n.

According to the steepest-descent method, X which minimizes e(X) can be obtained by a convergence value of a following recurrence equation, $$X(n+1) = X(n) - G * \frac{\partial e}{\partial X}$$

(equation 3). In this equation, G is a minute constant and is determined as an optimum value on the basis of the state of actual image represented by restored values of pixels.

Figure 14:
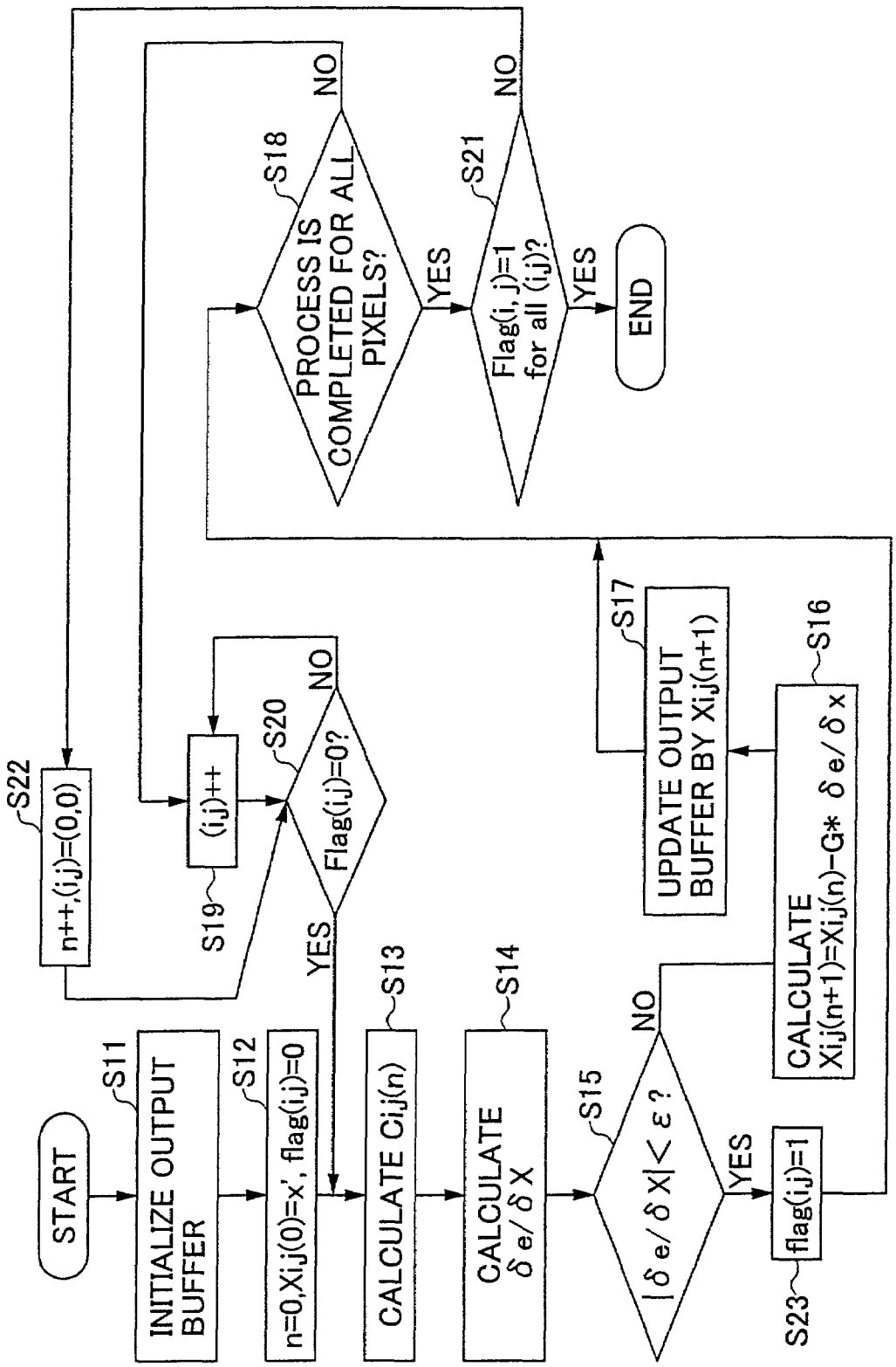
FIG. 14 is a flowchart showing an example of a process for restoring (sharpening) an edge part of the edge smoothed image.

The process for obtaining the restored pixel value of each pixel by the repeating operation by the equation 3 is performed according to a procedure shown in FIG. 14 for example.

In FIG. 14, first, an output buffer is initialized in step S11 and an initial value is set to each variable in step S12. That is, initial value "0" is set to a repetition count number n (n=0) and the pixel value x' of the edge smoothed image is set to the initial value $X_{ij}(0)$ of a restored image value $X_{ij}$ of a pixel $p_{ij}$ for each pixel. In addition, "0" is set to each flag Flag(i,j) which corresponds to each pixel $p_{ij}$ (Flag(i,j)=0). The flag Flag(i,j) indicates whether the restored pixel value of the pixel $p_{ij}$ is converged by the after-mentioned repeating operation.

In this state, a mean vale $C_{ij}(n)$ of pixel values of eight pixels which surround the pixel $p_{ij}$ in the edge smoothed image is calculated in step S13, and a differential value of e(X) in the equation 2 is calculated by ax $$\frac{\partial e}{\partial X}(X = Xij(n))$$

(equation 4) in step S14. Then, it is judged whether the differential value satisfies a condition $$\left|\frac{\partial e}{\partial X(n)}\right| < \varepsilon$$

(ε:constant) (equation 5) in step S15.

If this condition is not satisfied (N in step S15), that is, if it is not regarded that the restored pixel value of the pixel $p_{ij}$ is converged to a value, $X_{ij}(n+1)$ is calculated according to the equation 3 by using $C_{ij}(n)$ and the differential value in step S16. When the restored image value $X_{ij}(n+1)$ is thus obtained, the restored pixel value $X_{ij}(n)$ of the pixel $p_{ij}$ in the output buffer is updated into $X_{ij}(n+1)$ in step S17.

After that, it is judged whether the process is performed for all pixels in the edge near region R in the edge smoothed image in step S18. When the process is not completed for all pixels (N in step S18), (i,j) is incremented in step S19 so that the pixel to be processed is changed.

When the pixel to be processed is changed, it is judged whether the flag Flag(i,j) is "0" in step S20. When this flag Flag(i,j) is "0", it means that the restored pixel value of the pixel is not converged. Thus, the mean value C(n) of pixel values (restored pixel values) of eight pixels surrounding the pixel is calculated in step S13 and the differential value is calculated according to the above-mentioned equation 4 in step S14. Then, it is judged whether the condition represented by the equation 5 is satisfied, that is, whether it can be regarded that the restored pixel value is converged in step S15. When this condition is not satisfied (N in step S15), in the same way as the above-mentioned process, $X_{ij}(n+1)$ is calculated according to the above-mentioned equation 3 in step S16, and the restored pixel value of the pixel $p_{ij}$ in the output buffer is updated to $X_{ij}(n+1)$ in step S17.

Similar processes (S18, S19, S20, S13-S17) are repeated hereinafter. Then, when it is judged that the above-mentioned process is completed for all pixels in the edge near region R in the edge smoothed image (Y in S18), it is judged whether each flag Flag(i,j) of the pixels is "1", that is, whether the restored image value can be regarded to be converged for every pixel in step S21.

When it is not judged that the flag Flag(i,j) is "1" for all pixels (N in step S21), the repetition count number n is incremented, and the initial value (0,0) is set to (i,j) so that the pixel $p_{00}$ which was processed first is again selected as a pixel to be processed in step S22. Then, it is judged whether the flag Flag(0,0) corresponding to the pixel $p_{00}$ is "0" in step S20. When the flag Flag(0,0) is "0", the restored pixel value of the pixel $p_{00}$ is updated according to the above-mentioned processes (S13-S17). After that, the above-mentioned processes (S20, S13-S19, S21) are performed repeatedly while changing the pixel to be processed one by one.

In this process, if the condition represented by the equation 5 is satisfied (Y in S15), it can be regarded that the restored pixel value $X_{ij}(n)$ corresponding to the pixel $p_{ij}$ stored in the output buffer is converged, and "1" is set to the flag Flag(i,j) of the pixel $p_{ij}$ in step S23. The above-mentioned processes (S18-S20, S13-S17, S18, S21, S22) are repeated hereinafter. In these processes, every time when the condition represented by the equation 5 is satisfied (Y in S15), "1" is set to the flag Flag(i,j) corresponding to the pixel $p_{ij}$.

When it is judged that the Flag(i,j) is "1" for every pixel to be processed (Y in S21), that is, when it is regarded that the restored pixel value is converged for every pixel to be processed, the sharpening process of the edge part of the edge smoothed image is completed. At the time, the restored pixel values X for all pixels are stored in the output buffer.

According to the smoothing process for the edge part of the original image and the sharpening process of the edge part of the edge smoothed image which is obtained by the smoothing process, the restored pixel values can be obtained with relatively high accuracy by performing the above-mentioned repeating operation regardless of degree of sharpening of each pixel according to the equation 1. In addition, by properly setting parameters in the edge restoring process (edge sharpening process), the number of repetition of the repeating process can be decreased so that the process time can be decreased.

Next, other configuration example of the image coding apparatus 10 and the image decoding apparatus 20 will be described.

In an image transmission system shown in FIG. 15, coding and decoding of moving images are performed. Therefore, an MPEG-4 video coding part 16 and an MPEG-4 video decoding part 25 are used instead of the JPEG coding part 15 in the image coding apparatus 10 and the JPEG decoding part 22 in the image decoding apparatus 20 in FIG. 3.

In the image coding apparatus 10, a frame image of an edge smoothed image obtained by the edge smoothing process for the input image is video-compressed and coded according to the standard method of MPEG-4 in the MPEG-4 video coding part 16. As a result, MPEG-4 code can be obtained as coded information.

In the image decoding apparatus 20, the MPEG-4 code is decoded for each frame image by the MPEG-4 video decoding part 25. Then, the edge sharpening part 24 performs edge sharpening process on each frame decoded image by using corresponding edge information. Accordingly, a moving image corresponding to an original image (moving image) is output from the image decoding apparatus 20.

In an image transmission system shown in FIG. 16, coding and decoding of a moving image are performed. In this image transmission system, an MPEG-4 shape coding part 17 and an MPEG-4 shape decoding part 26 are used instead of the JBIG coding part 12 which performs coding of edge information in the image coding apparatus 10 and the JBIG decoding part 21 which decodes the coded edge information in the image decoding apparatus 20 shown in FIG. 3.

In the image coding apparatus 10, the edge information is compressed and coded without distortion by the MPEG-4 shape coding part 17. Accordingly, in addition that the edge image is coded within each closed frame, the edge image can be compressed by using a correlation between frames in the direction of time. Thus, compression efficiency of the edge information can be improved. In addition, the MPEG-4 shape coding part 17 can output code of only binary image data (MPEG-4 shape code) as the coded edge information by using BINARY ONLY coding mode of the MPEG-4 core profile. Then, the image decoding apparatus 20 which performs desired operation can be configured only by providing a decoding part complying with the MPEG-4 core profile (MPEG-4 shape decoding part 26 and MPEG-4 video decoding part 25), and, providing a function for performing processes on the MPEG-4 shape code (used for edge sharpening after distance conversion).

In each of the above-mentioned examples, although the image decoding apparatus 20 decodes coded edge information and coded density information obtained by coding density information of the edge smoothed image sent from the image coding apparatus 10, each coded information may be provided to the image decoding apparatus 20 by using a recording medium such as MO (magneto-optical disk).

In addition, the coded density information which is obtained by coding density information of the edge smoothed image and uncoded edge information may be provided to the image decoding apparatus 20. In this case, the image decoding apparatus 20 obtains a reproduced image by performing the sharpening process on density information on the basis of edge information which is obtained by means of some kind (receiving from transmission line, reading out from recording medium and the like), wherein the density information is obtained by decoding the coded density information.

As mentioned above, according to the present invention, relatively high spatial frequency components decrease in the edge smoothed image obtained by smoothing the edge part of the original image. Thus, even when the image is coded according to a standard coding algorithm, information which is lost by coding decreases. As a result, an image coding/decoding method for obtaining a decoded image of low distortion even when the standard coding/decoding method using DCT is applied can be realized.

In addition, according to the present invention, an image coding apparatus and an image decoding apparatus which perform coding and decoding of an image according to the image coding/decoding method can be realized.

The present invention is not limited to the specifically disclosed embodiments, and variations and modifications may be made without departing from the scope of the invention.

What is claimed is:

1. An image coding/decoding method in which an image coding apparatus sends coded information which is obtained by coding an original image to an image decoding apparatus and said image decoding apparatus decodes said coded information to obtain a reproduced image, said method comprising the steps of:

extracting edge information which is binary information representing an edge part of said original image;

obtaining density information of an edge unsharpened image from said original image by unsharpening said edge part using said edge information, unsharpening the edge part includes obtaining density information x' of a pixel of said edge part of said edge unsharpened image according to a first equation x'=(1−λ)x+λC, wherein λ is a positive constant, x is density information of said pixel of said original image, and C is surrounding density information representing density state of a surrounding region of said pixel;

obtaining coded edge information by coding said edge information according to a first coding algorithm;

obtaining coded density information by coding said density information of said edge unsharpened image according to a second coding algorithm;

sending said coded edge information and said coded density information as said coded information to said image decoding apparatus; and said image decoding apparatus performing the steps of:

obtaining said edge information by decoding said coded edge information according to a first decoding algorithm corresponding to said first coding algorithm;

obtaining said density information of said edge unsharpened image by decoding said coded density information according to a second decoding algorithm corresponding to said second coding algorithm;

obtaining said reproduced image from said density information of said edge unsharpened image by restoring said edge part of said edge unsharpened image by using said edge information and using a predetermined equation according to a steepest-descent method, said predetermined equation being defined on the basis of a relationship between said density information x' formulated by said first equation and restored density information;

wherein said second coding algorithm and said second decoding algorithm are based on a standard coding method using a discrete cosine transform, and wherein all the above steps are performed using one or more processors.

2. The image coding/decoding method as claimed in claim 1, said image coding apparatus unsharpening said edge part by performing, while scanning said original image pixel by pixel, the steps of:

performing first matrix operation by using a first block density information vector and a unsharpening matrix, wherein said first block density information vector is obtained by arranging density information of each pixel included in a first block, said first block includes a pixel in said edge part or in a near region of said edge part and includes pixels in a surrounding region around said pixel, and order of said first block density information vector corresponds to the number of pixels in said first block, and wherein said unsharpening matrix includes coefficients used for edge unsharpening which operate on density information of each pixel in said first block;

obtaining unsharpened density information of each pixel by overlaying density information of each pixel in said first block obtained by performing said first matrix operation on each pixel while scanning said original image pixel by pixel.

3. The image coding/decoding method as claimed in claim 2, said image decoding apparatus restoring said edge part of said edge unsharpened image by performing, while scanning said edge unsharpened image pixel by pixel, the steps of:

performing second matrix operation by using a second block density information vector and a restoring matrix which is an inverse matrix of said unsharpening matrix, wherein said second block density information vector is obtained by arranging density information of each pixel included in a second block, said second block includes a pixel in said edge part or in a near region of said edge part and pixels in said surrounding region, and order of said second block density information vector corresponds to the number of pixels in said second block; and obtaining restored density information of each pixel by overlaying density information of each pixel in said second block obtained by performing said second matrix operation on each pixel while scanning said edge unsharpened image pixel by pixel.

4. The image coding/decoding method as claimed in claim 1, wherein said predetermined equation is $$e(X) = \left(X + \frac{1}{1-\lambda}(\lambda C(n) - x')\right)^2$$

in which C(n) is said surrounding density information for a pixel having density information x' and n is a repetition count number, and a value of X which minimizes e(X) is obtained by said steepest-descent method and said value of X becomes density information of a pixel after being restored.

5. The image coding/decoding method as claimed in claim 4, wherein, in a process according to said steepest-descent method, X is obtained as a convergence value of a recurrence formula $$X(n+1) = X(n) - G * \frac{\partial e}{\partial X},$$

wherein G is a constant.

6. An image coding/decoding method in which an image coding apparatus sends coded information which is obtained by coding an original image to an image decoding apparatus and said image decoding apparatus decodes said coded information to obtain a reproduced image, said method comprising the steps of:

extracting edge information which is binary information representing an edge part of said original image;

converting said edge information which is binary information into a distance map including distance values between pixels of said edge part and other pixels;

obtaining density information of an edge unsharpened image from said original image by unsharpening said edge part using said distance map;

obtaining coded edge information by coding said edge information according to a first coding algorithm;

obtaining coded density information by coding said density information of said edge unsharpened image according to a second coding algorithm;

sending said coded edge information and said coded density information as said coded information to said image decoding apparatus; and said image decoding apparatus performing the steps of:
obtaining said edge information by decoding said coded edge information according to a first decoding algorithm corresponding to said first coding algorithm;
obtaining said density information of said edge unsharpened image by decoding said coded density information according to a second decoding algorithm corresponding to said second coding algorithm;
obtaining said reproduced image from said density information of said edge unsharpened image by restoring said edge part of said edge unsharpened image by using said edge information;
wherein said second coding algorithm and said second decoding algorithm are based on a standard coding method using a discrete cosine transform, and wherein all the above steps are performed using one or more processors.

7. An image coding apparatus comprising:
an edge extracting part for extracting edge information which is binary information representing an edge part of an original image;
an edge unsharpening part for obtaining density information of an edge unsharpened image from said original image by unsharpening said edge part using said edge information, said edge unsharpening part including a density information correction part for correcting density information of each pixel such that variation of density levels represented by density information of pixels which are arranged across said edge part in a near region of said edge part of said original image is lowered, said density information correction part including:
a mean value calculation part for calculating a mean value of density levels in a predetermined region; and
a density level judgment part for judging whether the density level of a pixel is higher or lower than said mean value for each pixel in said near region, wherein density information is corrected for a pixel in which said density level is higher than said mean value such that said density level is lowered, and density information is corrected for a pixel in which said density level is lower than said mean value such that said density level is increased;
a first coding part for obtaining coded edge information by coding said edge information according to a first coding algorithm;
a second coding part for obtaining coded density information by coding said density information of said edge unsharpened image according to a second coding algorithm;
wherein said coded edge information and said coded density information are coded information of said original image, and wherein said second coding algorithm is based on a standard coding method using a discrete cosine transform.

8. The image coding apparatus as claimed in claim 7, wherein said density information correction part corrects density information of each pixel in said near region such that said mean value of said density levels does not change.

9. The image coding apparatus as claimed in claim 7, said edge unsharpening part comprising:
a unsharpening matrix generation part for generating, for each block which includes said edge part or a near region of said edge part, a unsharpening matrix which is used for matrix operation with a block density information vector, wherein said block density information vector is obtained by arranging density information of each pixel included in a block, and order of said block density information vector corresponds to the number of pixels in said block, and wherein said unsharpening matrix includes coefficients used for edge unsharpening which operate on density information of each pixel in said edge part or in said near region in said block; and
a matrix operation part for obtaining unsharpened density information of each pixel in said block by performing matrix operation by using said unsharpening matrix and said block density information vector.

10. The image coding apparatus as claimed in claim 7, said edge unsharpening part comprising:
a pixel judgement part for judging whether a pixel exists in said edge part or in a near region of said edge part while scanning said original image pixel by pixel;
a matrix operation part for performing, when said pixel exists in said edge part or in said near region, matrix operation by using a block density information vector and a unsharpening matrix, wherein said block density information vector is obtained by arranging density information of each pixel included in a block, said block includes said pixel and pixels in a surrounding region around said pixel, and order of said block density information vector corresponds to the number of pixels in said block, and wherein said unsharpening matrix includes coefficients used for edge unsharpening which operate on density information of each pixel in said block;
an operation part for obtaining unsharpened density information of each pixel by overlaying density information of each pixel in said block obtained by performing said matrix operation on each pixel while scanning said original image pixel by pixel.

11. The image coding apparatus as claimed in claim 10, said pixel judgement part comprising:
a distance conversion part for generating distance information representing distances between said edge part and each pixel; and
a distance judgment part for judging whether said distance information for each pixel is equal to or smaller than a predetermined value;
wherein, when said distance information is judged to be equal to or smaller than said predetermined value, it is judged that a pixel corresponding to said distance information exists in said edge part or in said near region.

12. The image coding apparatus as claimed in claim 7, wherein said edge unsharpening part obtains density information x' of a pixel of said edge part of said edge unsharpened image according to an equation $x'=(1-\lambda)x+\lambda C$, wherein $\lambda$ is a positive constant, x is density information of said pixel of said edge part of said original image, and C is surrounding density information representing density state of a surrounding region of said pixel.

13. An image decoding apparatus which decodes coded information which includes coded edge information obtained by coding edge information representing an edge part of an original image and coded density information representing an edge unsharpened image obtained by unsharpening said edge part of said original image using said edge information, said image decoding apparatus comprising:
a first decoding part for obtaining said edge information which is binary information representing said edge part by decoding said coded edge information according to a first decoding algorithm;
a second decoding part for obtaining density information of said edge unsharpened image by decoding said coded density information according to a second decoding algorithm;

an edge restoring part for restoring said edge part of said edge unsharpened image by using said edge information such that a reproduced image is obtained, said edge restoring part including a density information correction part for correcting density information of each pixel of said edge unsharpened image such that variation of density levels represented by density information of pixels which are arranged across said edge part in a near region of said edge part of said edge unsharpened image is increased, said density information correction part including:
a mean value calculation part for calculating a mean value of density levels in a predetermined region; and
a density level judgment part for judging whether the density level of a pixel is higher or lower than said mean value for each pixel in said near region, wherein density information is corrected for a pixel in which said density level is higher than said mean value such that said density level is increased, and density information is corrected for a pixel in which said density level is lower than said mean value such that said density level is lowered,
wherein said second decoding algorithm is based on a standard coding method using a discrete cosine transform.

14. The image decoding apparatus as claimed in claim 13, wherein said density information correction part corrects density information of each pixel in said near region such that said mean value of said density levels does not change.

15. The image decoding apparatus as claimed in claim 13, said edge restoring part comprising:
a restoring matrix generation part for generating, for each block in said edge part or a near region of said edge part in said edge unsharpened image, a restoring matrix which is used for matrix operation with a block density information vector, wherein said block density information vector is obtained by arranging density information of each pixel included in a block, and order of said block density information vector corresponds to the number of pixels in said block, and wherein said restoring matrix includes coefficients used for edge restoring which operate on density information of each pixel in said edge part or in a near region of said edge part in said block; and
a matrix operation part for obtaining restored density information of each pixel in said block by performing said matrix operation by using said restoring matrix and said block density information vector.

16. The image decoding apparatus as claimed in claim 15, wherein said restoring matrix generation part generates an inverse matrix of a unsharpening matrix as said restoring matrix in which said unsharpening matrix is used for obtaining density information of said edge unsharpened image which is decoded from said coded density information.

17. The image decoding apparatus as claimed in claim 13, said edge restoring part comprising:
a pixel judgement part for judging whether a pixel exists in said edge part represented by said edge information or in a near region of said edge part while scanning said edge unsharpened image pixel by pixel;
a matrix operation part for performing, when said pixel exists in said edge part or in said near region, matrix operation by using a block density information vector and a restoring matrix, wherein said block density information vector is obtained by arranging density information of each pixel included in a block, said block includes said pixel and pixels in a surrounding region around said pixel, and order of said block density information vector corresponds to the number of pixels in said block, and wherein said restoring matrix includes coefficients used for edge restoring which operate on density information of each pixel in said block;
an operation part for obtaining restored density information of each pixel by overlaying density information of each pixel in said block obtained by performing said matrix operation on each pixel while scanning said edge unsharpened image pixel by pixel.

18. The image decoding apparatus as claimed in claim 17, said pixel judgement part comprising:
a distance conversion part for generating distance information representing distances between said edge part and each pixel; and
a distance judgment part for judging whether said distance information for each pixel is equal to or smaller than a predetermined value;
wherein, when said distance information is judged to be equal to or smaller than said predetermined value, it is judged that a pixel corresponding to said distance information exists in said edge part or in said near region of said edge unsharpened image.

19. The image decoding apparatus as claimed in claim 17, wherein said restoring matrix is an inverse matrix of a unsharpening matrix in which said unsharpening matrix is used for obtaining density information of said edge unsharpened image which is decoded from said coded density information.

20. The image decoding apparatus as claimed in claim 13, wherein said edge restoring part restores said edge part of said edge unsharpened image by using a predetermined equation according to a steepest-descent method, said predetermined equation being defined on the basis of a relationship between density information x' of a pixel of said edge part of said edge unsharpened image and restored density information, wherein said density information x' is formulated by a first equation x'=(1−λ)x+λC, wherein λ a positive constant, x is density information of said pixel of said original image, and C is surrounding density information representing density state of a surrounding region of said pixel.

21. The image decoding apparatus as claimed in claim 20, wherein said predetermined equation is $$e(X) = \left(X + \frac{1}{1-\lambda}(\lambda C(n) - x')\right)^2$$

in which C(n) is said surrounding density information for a pixel having density information x' and n is a repetition count number, and a value of X which minimizes e(X) is obtained by said steepest-descent method and said value of X becomes density information of a pixel after being restored.

22. The image decoding apparatus as claimed in claim 21, wherein, in a process according to said steepest-descent method, X is obtained as a convergence value of a recurrence formula $$X(n+1) = X(n) - G * \frac{\partial e}{\partial X},$$

wherein G is a constant.

23. An image decoding apparatus which decodes coded information of an image, said image decoding apparatus comprising:

an edge information obtaining part for obtaining edge information which is binary information representing an edge part of said image;

a decoding part for obtaining density information of said image by decoding said coded information according to a predetermined decoding algorithm;

an edge restoring part for restoring said edge part by using said edge information for said density information of said image such that a reproduced image is obtained, said edge restoring part including a density information correction part for correcting density information of each pixel of said edge unsharpened image such that variation of density levels represented by density information of pixels which are arranged across said edge part in a near region of said edge part of said edge unsharpened image is increased;

a reference value calculation part for calculating a reference value of said density levels in a predetermined region; and a density level judgment part for judging whether said density level of a pixel is higher or lower than said reference value for each pixel in said near region, wherein density information is corrected for a pixel in which said density level is higher than said reference value such that said density level is increased, and density information is corrected for a pixel in which said density level is lower than said reference value such that said density level is lowered and wherein said predetermined decoding algorithm is based on a standard coding method using a discrete cosine transform.

24. The image decoding apparatus as claimed in claim 23, said edge information obtaining part comprising an edge decoding part for obtaining said edge information by decoding coded edge information which is provided to said image decoding apparatus according to a predetermined decoding algorithm.

* * * * *